United States Patent
Schlachter et al.

(10) Patent No.: US 10,809,109 B2
(45) Date of Patent: Oct. 20, 2020

(54) FLUID LINE SYSTEM

(71) Applicant: Endress + Hauser Flowtec AG, Reinach (CH)

(72) Inventors: Natalie Schlachter, Wehr (DE); Marc Werner, Grenzach-Wyhlen (DE)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 0 days.

(21) Appl. No.: 16/302,234

(22) PCT Filed: Apr. 27, 2017

(86) PCT No.: PCT/EP2017/060079
§ 371 (c)(1),
(2) Date: Nov. 16, 2018

(87) PCT Pub. No.: WO2017/198440
PCT Pub. Date: Nov. 23, 2017

(65) Prior Publication Data
US 2019/0277683 A1    Sep. 12, 2019

(30) Foreign Application Priority Data

May 17, 2016    (DE) .................... 10 2016 109 058

(51) Int. Cl.
*G01F 1/84*    (2006.01)
*G01F 15/18*    (2006.01)
(Continued)

(52) U.S. Cl.
CPC .......... *G01F 1/8413* (2013.01); *G01F 1/8409* (2013.01); *G01F 1/8495* (2013.01);
(Continued)

(58) Field of Classification Search
CPC ....................................................... G01F 1/84
See application file for complete search history.

(56) References Cited

U.S. PATENT DOCUMENTS 5,473,949 A * 12/1995  Cage ..................... G01F 1/8409
                                                                  73/32 A
5,661,232 A     8/1997  Van Cleve et al.
(Continued)

FOREIGN PATENT DOCUMENTS

CN          1163736 C       8/2004
CN       101910805 A      12/2010
(Continued)

OTHER PUBLICATIONS

German Search Report, German PTO, Munich, dated Jan. 13, 2017.
(Continued)

*Primary Examiner* — Paul M. West
*Assistant Examiner* — Mark A Shabman
(74) *Attorney, Agent, or Firm* — Bacon & Thomas, PLLC

(57) ABSTRACT

A fluid line system comprises fluid lines (100, 200, 300, 400). Each of the two fluid lines (100, 400) has in each case one lumen (**100\*; 400\*) which is enclosed by a wall, and extends from a flow opening (100a; 400a), located in a respective first line end (100+; 400+), of the respective fluid line both to a flow opening (100b; 400b) which is located in a line end (100#; 400#) of said fluid line (100; 400) and also as far as a flow opening (100c; 400c) which, spaced apart from said flow opening (100b; 400b), is likewise located in each case in the line end (100#; 400#) of said fluid line (100; 400). Each of the other two fluid lines (200, 300) in turn has a lumen (200\*; 300\*) which is enclosed by a wall and extends from a flow opening (200a; 300a) which is located in a line end (200+; 300+) of the respective fluid line (200; 300) as far as a flow opening (200b; 300b) which is located in a line end (200#; 300#) of said fluid line (200; 300), in such a way that a greatest flow section ($A_{200,Max}$; $A_{300,Max}$) of the respective fluid line (200; 300) is spaced apart both from its line end (200+; 300+) and from its line end (200#;**

(Continued)

300#). Both the fluid line (200) and the fluid line (300) are connected by way of their line end (200+; 300+) in each case to the line end (100#) of the fluid line (100) and by way of their line end (200#; 300#) in each case to the line end (400#) of the fluid line (400). The flow openings (200a; 200b; 300a; 300b) form in each case one inlet-side and outlet-side flow cross section ($A_{200a}$, $A_{200b}$; $A_{300a}$; $A_{300b}$) of the respective fluid line (200; 300). In addition, the fluid lines (100, 200, 300, 400) are configured in such a way that an outlet-side flow cross section ($A_{100,min}$; $A_{100,min}$) of the fluid line (100; 400) which is located at the line end (100#; 400#) of the fluid line (100; 400) and adjoins both the flow opening (100b; 400b) and the flow opening (100c; 400c) of said fluid line (100; 400) and flow cross sections ($A_{200a}$; $A_{200b}$; $A_{300a}$; $A_{300b}$) overall fulfil the conditions: (I) and (II), and (III) and (IV).

31 Claims, 4 Drawing Sheets

(51) Int. Cl.
*G01K 11/26* (2006.01)
*G01N 9/00* (2006.01)
*G01N 11/16* (2006.01)

(52) U.S. Cl.
CPC ............ *G01F 15/185* (2013.01); *G01K 11/26* (2013.01); *G01N 9/002* (2013.01); *G01N 11/16* (2013.01); *G01N 2009/006* (2013.01)

(56) References Cited

U.S. PATENT DOCUMENTS

| | | | | |
|---|---|---|---|---|
| 5,691,485 A | * | 11/1997 | Endo | G01F 1/8409 |
| | | | | 73/861.357 |
| 10,240,958 B2 | * | 3/2019 | Blackmore | G01F 1/8413 |
| 2008/0115577 A1 | | 5/2008 | Headrick | |
| 2015/0082916 A1 | * | 3/2015 | Sukemura | G01F 1/8495 |
| | | | | 73/861.357 |
| 2015/0153210 A1 | | 6/2015 | Bartlett et al. | |

FOREIGN PATENT DOCUMENTS

| | | |
|---|---|---|
| CN | 102348963 A | 2/2012 |
| CN | 104246452 A | 12/2014 |
| DE | 36 32 800 A1 | 4/1988 |
| DE | 10 2009 027 580 A1 | 1/2011 |
| EP | 0 261 435 A2 | 3/1988 |
| EP | 0 272 758 A2 | 6/1988 |

OTHER PUBLICATIONS

International Search Report, EPO, The Netherlands, dated Aug. 9, 2017.

Office Action dated Dec. 25, 2019 issued in corresponding Chinese application No. 201780030047.4.

* cited by examiner

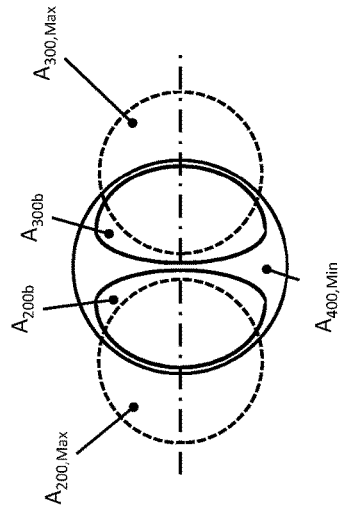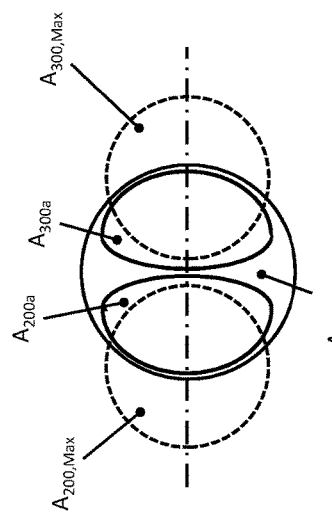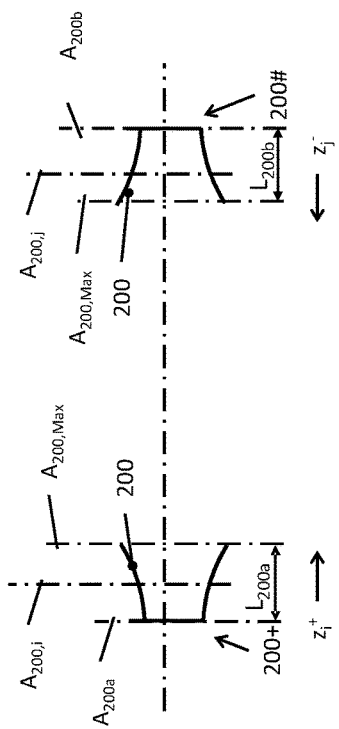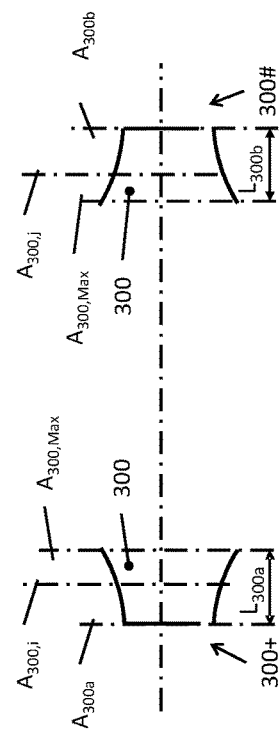

FLUID LINE SYSTEM

TECHNICAL FIELD

The invention relates to a fluid line system, especially a fluid line system serving for measuring at least one physical, measured variable of a fluid flowing in a pipeline.

BACKGROUND DISCUSSION

Disclosed in European Patent EP-A 816 807, US-A 2001/0037690, US-A 2008/0184816, US-A 2011/0161017, US-A 2011/0154912, US-A 2011/0161018, US-A 2011/0146416, US-A 2012/0167697, US-A 2015/0082916, U.S. Pat. Nos. 4,801,897, 4,823,613, 5,602,345, 5,796,011, published international applications WO-A 90/15310, WO-A 00/08423, WO-A 2006/107297, WO-A 2006/118557, WO-A 2008/059262, WO-A 2009/048457, WO-A 2009/078880, WO-A 2009/120223, WO-A 2009/123632, WO-A 2010/059157, WO-A 2012/170020, WO-A 2013/006171, WO-A 2013/070191, and WO-A 2015/085025 or even applicant's own, not pre-published, German patent application 102015118864.3 is, in each case, at least one fluid line system serving for conveying a flowing fluid, for example, a liquid, a gas or a dispersion. The fluid line system includes a first fluid line embodied as a line fork, at times, also referred to as a distributor, collector, pant legs or even flow divider, with a (Y-shaped) lumen surrounded by a wall and extending from a first flow opening located in a first line end of the first fluid line both until it reaches a second flow opening located in a second line end of the first fluid line as well as also until it reaches a third flow opening located spaced from the second flow opening in the second line end of the first fluid line, a second fluid line embodied as a rigid tube and having a lumen surrounded by a wall and extending from a first flow opening located in a first line end of the second fluid line until it reaches a second flow opening located in a second line end of the second fluid line, a third fluid line embodied as a rigid tube and having a lumen surrounded by a wall and extending from a first flow opening located in a first line end of the third fluid line until it reaches a second flow opening located in a second line end of the third fluid line as well as a fourth fluid line embodied as a line junction and otherwise embodied essentially equally to the first fluid line. The walls of the fluid lines can be, for example, of a metal, such as e.g. a stainless steel.

The fluid line system is provided, especially, for conveying a fluid entering into the first fluid line via the first flow opening, via the second and third fluid lines, to the fourth fluid line, from which it leaves the fluid line system. For such purpose, the first fluid line is connected with its second line end both with the first line end of the second fluid line as well as also with the first line end of the third fluid line, in such a manner that both the lumen of the second fluid line as well as also the lumen of the third fluid line communicate with the lumen of the first fluid line, and that the first flow opening of the second fluid line communicates with the second flow opening of the first fluid line and the first flow opening of the third fluid line communicates with the third flow opening of the first fluid line. Analogously thereto, the fourth fluid line is connected with its second line end both with the second line end of the second fluid line as well as also with the second line end of the third fluid line, in such a manner that both the lumen of the second fluid line as well as also the lumen of the third fluid line also communicate with the lumen of the fourth fluid line, and that the second flow opening of the second fluid line communicates with the second flow opening of the fourth fluid line and the second flow opening of the third fluid line communicates with the third flow opening of the fourth fluid line, so that, as a result, the fluid line system provides two paths, through the second fluid line and through the third fluid line, for parallel flow.

The fluid lines of the above described fluid line systems are, additionally, embodied as integral components of vibronic measuring transducers, which serve, and are adapted, to generate at least one measurement signal corresponding to at least one measured variable, for example, a mass flow rate, a density or a viscosity, of the through flowing fluid, namely a measurement signal having at least one signal parameter dependent on the measured variable, for example, a signal level dependent on the measured variable and/or a signal frequency dependent on the measured variable and/or a phase angle dependent on the measured variable. The measuring transducer is, in turn, connected with a corresponding measuring device-electronics, in order to form a flow measuring device, for example, a Coriolis-mass flow-measuring device, a density-measuring device and/or a viscosity-measuring device. Additionally, the second fluid line and the third fluid line are, furthermore, adapted to be flowed through by the fluid to be measured and during that to be caused to vibrate for the purpose of generating the at least one measurement signal, wherein serving as measurement signal is an oscillation measurement signal representing oscillatory movements of the second and/or third fluid lines and having at least one signal frequency dependent on a density of the fluid conveyed in the fluid lines and/or a phase angle dependent on a mass flow rate.

For exciting and maintaining mechanical oscillations, for example, bending oscillations, of both the second fluid line as well as also the third fluid line, each of the above described fluid line systems comprises, furthermore, at least one electromechanical oscillation exciter, for example, an electrodynamic oscillation exciter. Moreover, the fluid line system includes at least one oscillation sensor, for example, an oscillation sensor mounted at least on the second fluid line and/or at least placed in its vicinity, for producing the at least one measurement signal corresponding to the measured variable. Particularly for the above described case, in which the fluid line system, and the measuring transducer formed therewith are provided to measure a mass flow rate, or a total mass flow, of the through flowing fluid, the fluid line system comprises, furthermore, at least one additional (second) oscillation sensor, for example, an additional (second) oscillation sensor mounted on the second fluid line away from the first sensor and/or at least placed in its vicinity, and, in given cases, also embodied equally to the first oscillation sensor, for producing at least one additional measurement signal likewise corresponding to the measured variable, especially in such a manner that a phase difference dependent on the mass flow rate is established between the two measurement signals. For the purpose of ascertaining the measured variable, the two vibrating fluid lines are typically actively excited by means of an electronic driver circuit provided in the measuring device-electronics, and electrically coupled both to the at least one sensor as well as also to the at least one oscillation sensor, and, in given cases, formed as a phase locked loop (PLL) to execute opposite equal resonant oscillations in a driven- or wanted mode, namely to execute oscillations at at least one instantaneous resonant frequency serving as wanted frequency for the measuring and being one of the natural oscillation modes, which they share (for example, such as, among other things, also shown in the above cited U.S. Pat. No. 4,801,897).

The above-discussed fluid line systems serving as measuring transducers are additionally, especially, provided and adapted to be inserted into the course of a pipeline, in such a manner that a fluid stream conveyed to the measuring transducer is divided by means of the first fluid line, thus within the measuring transducer, into two separate fluid streams, and that the fluid streams are merged by means of the fourth fluid line, thus likewise within the measuring transducer, back to a single fluid stream, so that the measuring transducer flow acts, as viewed from the outside, as a single tube, and, additionally, can be connected by means by standard flange connections, very simply and without additional technical effort, to the corresponding segments of the pipeline. Such fluid line systems, and vibronic measuring transducers formed therewith, serving, for example, for generating Coriolis forces dependent on a mass flow rate of the flowing fluid, are manufactured by the applicant, and, in combination with a suitably tailored measuring electronics, offered as Coriolis-mass flow-measuring devices, or Coriolis-mass flow-/density-measuring devices, for example, under the trademarks, "Promass F 200", "PROMVSS G 100", "PROMVSS O 100", "PROMVSS 83E", "PROMVSS 84F", "CNGmass", "LPGmass" or "Dosimass".

Investigations on fluid line systems of the above described type have shown that their second and third fluid lines, at times, not least of all in the aforementioned case, in which the fluid is a gas, can also be excited significantly to resonance-oscillations, which besides the instantaneous density are significantly also dependent on the instantaneous mass flow rate, and that at certain mass flow rates the measuring- and operating-electronics incorrectly selects and drives such a resonant frequency as wanted frequency, which does not correspond to the instantaneous resonant frequency of the natural oscillatory mode actually provided as wanted mode. Associated therewith, especially also the measured values ascertained for the mass flow rate can, in considerable, equally as well unpredictable, measure, deviate from the actual mass flow rate, coupled with a comparatively high scattering. Thus, the measured values can have measuring errors, which are too high and a reproducibility, which is too low. Further investigations have, in such case, shown that a possible cause for the above described measuring errors is that in the case of fluid system of the type being discussed the out flowing fluid forms extremely turbulent flow profiles, especially within the fourth fluid line serving as line junction. This, especially, also in such a manner that the interaction of fluid system and fluid flowing through regularly establishes on the outlet side a sound source, which generates in the fluid sound of comparatively high intensity within a comparatively broad band frequency spectrum, namely a frequency spectrum containing most often a number of resonance frequencies of the fluid line. The sound waves so induced in the fluid on the outlet side can, among other things, also propagate counter to the flow direction established in the fluid system into the second and third fluid lines and further into the first fluid line and so transport sound energy originating on the outlet side, via the second and third fluid lines, in considerable measure upstream to the inlet side, first fluid line. As a result, at times, also standing sound waves can arise in the fluid line system, so that, at least temporarily, an acoustic resonator can be formed, which executes oscillations with acoustic resonance frequencies corresponding to the particular wavelengths, in such a manner that, in the case of agreement of an instantaneous resonant frequency of the acoustic resonator and an instantaneous (mechanical) resonant frequency of the second and third fluid lines, the latter execute significant mechanical oscillations with the resonant frequency. For the frequently possible case, in which the resonant frequency of the oscillations induced by sound and the resonant frequency of the actual wanted mode lie within the frequency range controlled by the driver circuit, then it can no longer directly be assured that the oscillation exciter actually actively excites and maintains only the oscillations in the actually desired, wanted mode and not, instead of that, temporarily the above described sound induced oscillations, nor can it be assured that the measuring of mass flow rate and/or density and/or viscosity is based on the resonant frequency of the intended wanted mode.

SUMMARY OF THE INVENTION

Taking this into consideration, an object of the invention is, consequently, to improve fluid line systems of the above described type, such that a tendency of their fluid lines to execute oscillations induced by sound is reduced; this, especially, in order to increase accuracy of measurement and reproducibility of measured values generated by means of measuring transducers formed by means of such a fluid line system.

For achieving the object, the invention resides in a fluid line system, comprising:
  a first fluid line (for example, a first fluid line embodied as a connection nozzle and/or as a line fork) with a lumen surrounded by a wall, for example, a metal wall, and extending from a first flow opening located in a first line end of the first fluid line, for example, a first line end held by a connecting flange, both until it reaches a second flow opening located in a second line end of the first fluid line as well as also until it reaches a third flow opening located spaced from the second flow opening in the second line end of the first fluid line;
  a second fluid line (for example, a second fluid line embodied as a rigid and/or at least sectionally circularly cylindrical tube) with a lumen surrounded by a wall, for example, a metal wall, and extending from a first flow opening located in a first line end of the second fluid line until it reaches a second flow opening located in a second line end of the second fluid line, in such a manner that a greatest flow cross section $A_{200,Max}$ of the second fluid line is spaced both from its first line end as well as also from its second line end;
  at least a third fluid line (for example, a third fluid line embodied as a rigid and/or at least sectionally circularly cylindrical tube and/or a third fluid line constructed equally to the second fluid line) with a lumen surrounded by a wall, for example, a metal wall, and extending from a first flow opening located in a first line end of the third fluid line until it reaches a second flow opening located in a second line end of the third fluid line, in such a manner that a greatest flow cross section $A_{300,Max}$ of the third fluid line is spaced both from its first line end as well as also from its second line end;
  as well as a fourth fluid line (for example, a fourth fluid line constructed equally to the first fluid line and/or embodied as a connection nozzle and/or serving as a line junction) with a lumen surrounded by a wall, for example, a metal wall, and extending from a first flow opening located in a first line end of the fourth fluid line, for example, a first line end held by a connecting flange, both until it reaches a second flow opening located in a second line end of the fourth fluid line as well as also until it reaches a third flow opening spaced from the second flow opening and located in the second line end of the fourth fluid line;

wherein both the second fluid line with its first line end as well as also the third fluid line with its first line end are, in each case, connected with the second line end of the first fluid line, for example, in such a manner that both the lumen of the second fluid line as well as also the lumen of the third fluid line communicate with the lumen of the first fluid line and/or in such a manner that the first flow opening of the second fluid line communicates with the second flow opening of the first fluid line and the first flow opening of the third fluid line communicates with the third flow opening of the first fluid line; and wherein both the second fluid line with its second line end as well as also the third fluid line with its second line end are, in each case, connected with the second line end of the fourth fluid line, for example, in such a manner that both the lumen of the second fluid line as well as also the lumen of the third fluid line communicate with the lumen of the fourth fluid line and/or in such a manner that the second flow opening of the second fluid line communicates with the second flow opening of the fourth fluid line and the second flow opening of the third fluid line communicates with the third flow opening of the fourth fluid line.

In the case of the fluid line system of the invention, the first flow opening of the second fluid line forms an inlet side, flow cross section $A_{200a}$ of the fluid line and the second flow opening of the second fluid line an outlet side, flow cross section $A_{200b}$ of the fluid line and additionally, the first flow opening of the third fluid line forms an inlet side, flow cross section $A_{300a}$ of the fluid line and the second flow opening of the third fluid line forms an outlet side, flow cross section $A_{300b}$ of the fluid line. Moreover, in the case of the fluid line system of the invention, the first fluid line, the second fluid line and the third fluid line are so embodied that an outlet side, flow cross section, $A_{100,Min}$, of the first fluid line located at the second line end of the first fluid line and equally as well adjoining the second flow opening as well as the third flow opening of the fluid line, the inlet side, flow cross section, $A_{200a}$, of the second fluid line as well as the inlet side, flow cross section $A_{300a}$ of the third fluid line, together, fulfill a condition:

$0.8 < (A_{200a} + A_{300a})/A_{100,Min}$ and that the outlet side, flow cross section $A_{100,Min}$ of the first fluid line, the greatest flow cross section $A_{200,Max}$ of the second fluid line as well as the greatest flow cross section $A_{300,Max}$ of the third fluid line, together, fulfill a condition:

$0.9 < (A_{200,Max} + A_{300,Max})/A_{100,Min}$, for example, at least approximately fulfill a condition:

$$\frac{A_{200,Max} + A_{300,Max}}{A_{100,Min}} = 1.$$

Alternatively or supplementally, in the case of the fluid line system of the invention, the first fluid line, the second fluid line and the fourth fluid line are so embodied that the outlet side, flow cross section $A_{200b}$ of the second fluid line, the outlet side, flow cross section $A_{300b}$ of the third fluid line as well as an inlet side, flow cross section $A_{400,Min}$ of the fourth fluid line located at the first line end of the fourth fluid line and equally as well adjoining the second flow opening, as well as the third flow opening of the fluid line, together, fulfill a condition $0.8 < (A_{200b} + A_{300b})/A_{400,Min}$ and that the greatest flow cross section $A_{200,Max}$ of the second fluid line, the greatest flow cross section $A_{300,Max}$ of the third fluid line as well as the inlet side, flow cross section $A_{400,Min}$ of the fourth fluid line, together, fulfill a condition:

$0.9 < (A_{200,Max} + A_{300,Max})/A_{400,Min}$, for example, at least approximately a condition:

$$\frac{A_{200,Max} + A_{300,Max}}{A_{400,Min}} = 1.$$

Furthermore, the invention resides in using such a fluid line system for ascertaining measured values of at least one measured variable, for example, a mass flow rate, a total mass flow, a volume flow rate, a total volume flow, a density, a viscosity or a temperature, of a fluid to be transferred, for example, a liquefied gas, such as, for instance, a methane and/or ethane and/or propane and/or butane containing, liquefied gas and/or a liquefied natural gas (LNG), or a compressed gas, for example, a compressed natural gas (CNG).

In a first embodiment of the invention, it is, furthermore, provided that the first fluid line, the second fluid line and the third fluid line are so embodied that the outlet side, flow cross section $A_{100,Min}$ of the first fluid line, the greatest flow cross section $A_{200,Max}$ of the second fluid line as well as the greatest flow cross section $A_{300,Max}$ of the third fluid line, together, fulfill a condition:

$(A_{200,Max} + A_{300,Max})/A_{100,Min} < 1.1$

In a second embodiment of the invention, it is, furthermore, provided that the second fluid line, the third fluid line and the fourth fluid line are so embodied that the greatest flow cross section $A_{200,Max}$ of the second fluid line, the greatest flow cross section $A_{300,Max}$ of the third fluid line as well as the inlet side, flow cross section $A_{400,Min}$ of the fourth fluid line, together, fulfill a condition:

$(A_{200,Max} + A_{300,Max})/A_{400,Min} < 1.1$.

In a third embodiment of the invention, it is, furthermore, provided that the lumen of the second fluid line is sectionally, for example, in a first transition extending from its inlet side, flow cross section $A_{200a}$ in the direction toward its greatest flow cross section $A_{200,Max}$ and/or in a second transition extending from its outlet side, flow cross section $A_{200b}$ in the direction toward its greatest flow cross section $A_{200,Max}$, embodied conically in such a manner that mutually adjoining flow cross sections $A_{200,j}$ of the second fluid line increase, starting from its inlet side, flow cross section $A_{200a}$ in a direction toward its greatest flow cross section $A_{200,Max}$, continuously, for example, linearly or exponentially and/or in such a manner that mutually adjoining flow cross sections $A_{200,j}$ of the second fluid line increase, starting from its outlet side, flow cross section $A_{200b}$ in a direction toward its greatest flow cross section $A_{200,Max}$, continuously, for example, linearly or exponentially.

In a fourth embodiment of the invention, it is, furthermore, provided that the lumen of the third fluid line is sectionally, for example, in a first transition extending from its inlet side, flow cross section $A_{300a}$ in the direction toward its greatest flow cross section $A_{300,Max}$ and/or in a second transition extending from its outlet side, flow cross section $A_{300b}$ in the direction toward its greatest flow cross section $A_{300,Max}$, embodied conically, in such a manner that mutually adjoining flow cross sections $A_{300,j}$ of the third fluid line increase, starting from its inlet side, flow cross section $A_{300a}$ in a direction toward its greatest flow cross section $A_{300,Max}$, continuously, for example, linearly or exponentially and/or in such a manner that mutually adjoining flow cross sections $A_{300,j}$ of the third fluid line increase, starting from its outlet side, flow cross section $A_{300b}$ in a direction toward its greatest flow cross section $A_{300,Max}$, continuously, for example, linearly or exponentially.

In a fifth embodiment of the invention, the second fluid line and the third fluid line are so embodied that the greatest flow cross section $A_{200,Max}$ of the second fluid line and the greatest flow cross section $A_{300,Max}$ of the third fluid line, together, fulfill a condition: $A_{200,Max}=A_{300,Max}$.

In a sixth embodiment of the invention, the first fluid line as well as the fourth fluid line are so embodied that the outlet side, flow cross section $A_{100,Min}$ of the first fluid line and the inlet side, flow cross section $A_{400,Min}$ of the fourth fluid line, together, fulfill a condition: $A_{100,Min}=A_{400,Min}$.

In a seventh embodiment of the invention, it is, furthermore, provided that the lumen of the second fluid line is embodied at least sectionally, for example, also predominantly, circularly cylindrically and that the greatest flow cross section $A_{200,Max}$ of the second fluid line is located in a circularly cylindrical section of the lumen.

In an eighth embodiment of the invention, it is, furthermore, provided that the lumen of the third fluid line is embodied at least sectionally, for example, also predominantly, circularly cylindrically and that the greatest flow cross section $A_{300,Max}$ of the third fluid line is located in a circularly cylindrical section of the lumen.

In a ninth embodiment of the invention, the second fluid line and the third fluid line are so embodied that the inlet side, flow cross section $A_{200a}$ of the second fluid line as well as the inlet side, flow cross section $A_{300a}$ of the third fluid line fulfill a condition: $A_{200a}=A_{300a}$.

In a tenth embodiment of the invention, it is, furthermore, provided that the outlet side, flow cross section $A_{200b}$ of the second fluid line as well as the outlet side, flow cross section $A_{300b}$ of the third fluid line fulfill a condition: $A_{200b}=A_{300b}$.

In an eleventh embodiment of the invention, it is, furthermore, provided that the inlet side, flow cross section $A_{200a}$ as well as the outlet side, flow cross section $A_{200b}$ of the second fluid line fulfill a condition: $A_{200a}=A_{200b}$.

In a twelfth embodiment of the invention, it is, furthermore, provided that the inlet side, flow cross section $A_{300a}$ as well as the outlet side, flow cross section $A_{300b}$ of the third fluid line fulfill a condition: $A_{300a}=A_{300b}$.

In a thirteenth embodiment of the invention, it is, furthermore, provided that the inlet side, flow cross section $A_{200a}$ and/or the outlet side, flow cross section $A_{200b}$ of the second fluid line form a smallest flow cross section $A_{200,Min}$ of the fluid line.

In a fourteenth embodiment of the invention, it is, furthermore, provided that the inlet side, flow cross section $A_{300a}$ and/or the outlet side, flow cross section $A_{300b}$ of the third fluid line form a smallest flow cross section $A_{300,Min}$ of the fluid line.

In a fifteenth embodiment of the invention, it is, furthermore, provided that the outlet side, flow cross section $A_{100,Min}$ of the first fluid line is embodied oval shaped.

In a sixteenth embodiment of the invention, it is, furthermore, provided that the inlet side, flow cross section $A_{200a}$ of the second fluid line is embodied oval shaped or semicircle shaped.

In a seventeenth embodiment of the invention, it is, furthermore, provided that the inlet side, flow cross section $A_{300a}$ of the third fluid line is embodied oval shaped or semicircle shaped.

In an eighteenth embodiment of the invention, it is, furthermore, provided that the outlet side, flow cross section $A_{200b}$ of the second fluid line is embodied oval shaped or semicircle shaped.

In a nineteenth embodiment of the invention, it is, furthermore, provided that the outlet side, flow cross section $A_{300b}$ of the third fluid line is embodied oval shaped or semicircle shaped.

In a twentieth embodiment of the invention, it is, furthermore, provided that the inlet side, flow cross section $A_{400,Min}$ of the fourth fluid line is embodied oval shaped.

In a twenty-first embodiment of the invention, it is, furthermore, provided that the second fluid line is so embodied that its inlet side, flow cross section $A_{200a}$ and its greatest flow cross section $A_{200,Max}$ fulfill a condition:

$0.7<A_{200a}/A_{200,Max}<1$, especially a condition:

$0.8<A_{200a}/A_{200,Max}<0.95$

In a twenty-second embodiment of the invention, it is, furthermore, provided that the greatest flow cross section $A_{200,Max}$ of the second fluid line is embodied circularly shaped.

In a twenty-third embodiment of the invention, it is, furthermore, provided that the greatest flow cross section $A_{300,Max}$ of the third fluid line is embodied circularly shaped.

In a twenty-fourth embodiment of the invention, it is, furthermore, provided that the third fluid line is so embodied that its inlet side, flow cross section $A_{300a}$ and its greatest flow cross section $A_{300,Max}$ fulfill a condition:

$0.7<A_{300a}/A_{300,Max}<1$, especially a condition:

$0.8<A_{300a}/A_{300,Max}<0.95$.

In a twenty-fifth embodiment of the invention, it is, furthermore, provided that the second fluid line is so embodied that its outlet side, flow cross section $A_{200b}$ and its greatest flow cross section $A_{200,Max}$ fulfill a condition:

$0.7<A_{200b}/A_{200,Max}<1$, especially a condition:

$0.8<A_{200b}/A_{200,Max}<0.95$.

In a twenty-sixth embodiment of the invention, it is, furthermore, provided that the third fluid line is so embodied that its outlet side, flow cross section $A_{300b}$ and its greatest flow cross section $A_{300,Max}$ fulfill a condition:

$0.7<A_{300b}/A_{300,Max}<1$ especially a condition:

$0.8<A_{300b}/A_{300,Max}<0.95$.

In a twenty-seventh embodiment of the invention, it is, furthermore, provided that the lumen of the first fluid line is embodied, at least sectionally, for example, also predominantly, circularly conically, for example, in such a manner that mutually adjoining flow cross sections $A_{100,i}$ of the first fluid line increase, starting from its outlet side, flow cross section $A_{100,Min}$, in a direction $zi^+$ toward the first line end continuously and/or according to the formula:

$A_{100,i}=A_{100,Min}\cdot e^{k\cdot zi}$;

and that the outlet side, flow cross section $A_{100,Min}$ of the first fluid line is located in a circularly conical section of the lumen of the fluid line.

In a twenty-eighth embodiment of the invention, it is, furthermore, provided that the lumen of the fourth fluid line is embodied at least sectionally, for example, also predominantly, circularly conically, for example, in such a manner that mutually adjoining flow cross sections $A_{400,j}$ of the fourth fluid line increase, starting from its inlet side, flow cross section $A_{400,Min}$, in a direction $zj^+$ toward its second line end continuously and/or according to the formula:

$$A_{400,j} = A_{400,Min} \cdot e^{k \cdot zj};$$

and that the smallest flow cross section $A_{400,Min}$ of the fourth fluid line is located in a circularly conical section of the lumen of the fluid line.

In a twenty-ninth embodiment of the invention, it is, furthermore, provided that the first flow opening 100*a* of the first fluid line forms an inlet side, flow cross section $A_{100a}$ of the fluid line; and that the first flow opening of the fourth fluid line forms an outlet side, flow cross section $A_{400a}$ of the fluid line, wherein the first fluid line and the fourth fluid line are so embodied that the inlet side, flow cross section $A_{100a}$ of the first fluid line forms a greatest flow cross section $A_{100,Max}$ of the first fluid line and/or that the outlet side, flow cross section $A_{400a}$ forms a greatest flow cross section $A_{400,Max}$ of the fourth fluid line.

In a thirtieth embodiment of the invention, the first fluid line is so embodied that its inlet side, flow cross section $A_{100a}$ as well as its outlet side, flow cross section $A_{100,Min}$, together, fulfill a condition:

$$1 < \frac{A_{100a}}{A_{100,Min}},$$

especially a condition:

$$1.5 < A_{100a}/A_{100,Min} \text{ and/or}$$

$$\frac{A_{100a}}{A_{100,Min}} < 3.$$

In a thirty first embodiment of the invention, the fourth fluid line is so embodied that its inlet side, flow cross section $A_{400,Min}$ as well as its outlet side, flow cross section $A_{400a}$, together, fulfill a condition:

$$1 < \frac{A_{400a}}{A_{400,Min}},$$

especially a condition:

$$1.5 < A_{400a}/A_{400,Min} \text{ and/or}$$

$$\frac{A_{400a}}{A_{400,Min}} < 3.$$

In a thirty second embodiment of the invention, it is, furthermore, provided that the inlet side, flow cross section of the first fluid line is embodied circularly shaped.

In a thirty third embodiment of the invention, it is, furthermore, provided that the outlet side, flow cross section of the fourth fluid line is embodied circularly shaped.

In a thirty fourth embodiment of the invention, it is, furthermore, provided that at least the second fluid line and the third fluid line are components of a measuring transducer, for example, a vibronic measuring transducer, serving for generating at least one measurement signal corresponding to the at least one measured variable.

In a thirty fifth embodiment of the invention, it is, furthermore, provided that at least the second fluid line is adapted to be flowed through by fluid and during that to be caused to vibrate. Developing this embodiment of the invention, it is, furthermore, provided that the third fluid line is adapted, for example, also simultaneously with the second fluid line, to be flowed through by fluid and during that, for example, also simultaneously with the second fluid line, to be caused to vibrate.

In a thirty sixth embodiment of the invention, it is, furthermore, provided that the first fluid line is formed by means of a distributor piece (for example, a distributor piece embodied as a line fork or line junction) of a measuring transducer, for example, a vibronic measuring transducer and/or a measuring transducer of a Coriolis-mass flow-measuring device.

In a thirty seventh embodiment of the invention, it is, furthermore, provided that a distributor piece (for example, a distributor piece embodied as a line fork or line junction) of a measuring transducer, for example, a vibronic measuring transducer and/or a measuring transducer of a Coriolis-mass flow-measuring device, is formed by means of the first fluid line.

In a thirty eighth embodiment of the invention, it is, furthermore, provided that the fourth fluid line is formed by means of a distributor piece (for example, a distributor piece embodied as a line fork or line junction) of a measuring transducer, for example, a vibronic measuring transducer and/or a measuring transducer of a Coriolis-mass flow-measuring device.

In a thirty ninth embodiment of the invention, it is, furthermore, provided that a distributor piece (for example, a distributor piece embodied as a line fork or line junction) of a measuring transducer, for example, a vibronic measuring transducer and/or a measuring transducer of a Coriolis-mass flow-measuring device, is formed by means of the fourth fluid line.

In a first further development of the invention, the fluid line system further comprises: a protective housing for the second fluid line and the third fluid line, wherein the protective housing has, surrounded by a wall, for example, of a metal, a cavity, within which the second fluid line and at least the third fluid line are placed. In an embodiment of this further development of the invention, a first housing end of the protective housing is formed by means of the first fluid line and a second housing end of the protective housing is formed by means of the fourth fluid line, for example, also in such a manner that both the first fluid line as well as also the fourth fluid line are integral components of the protective housing and/or that the protective housing has, laterally limiting the cavity, a side wall, which is affixed laterally both to the first fluid line as well as also to the fourth fluid line, and/or connected by material bondng both with the first fluid line as well as also with the fourth fluid line.

In a second further development of the invention, the fluid line system further comprises: at least one oscillation exciter, for example, an electrodynamic oscillation exciter, for exciting and maintaining mechanical oscillations, for example, bending oscillations, at least of the second fluid line, for example, also for exciting and maintaining mechanical oscillations of both the second fluid line as well as also the third fluid line.

In a third further development of the invention, the fluid line system further comprises: at least a first sensor, especially a first sensor at least mounted on the second fluid line and/or at least placed in its vicinity and/or an electrodynamic first sensor, for producing at least a first measurement signal corresponding to a measured variable of a fluid conveyed in the fluid line system, namely at least a first measurement signal having signal parameters dependent on the measured variable, for example, a signal level dependent on the measured variable and/or a signal frequency dependent on the measured variable and/or a phase angle dependent on the measured variable.

In a fourth further development of the invention, the fluid line system further comprises: a first sensor, especially a first sensor at least mounted on the second fluid line and/or at least placed in its vicinity and/or an electrodynamic first sensor, for producing at least a first measurement signal corresponding to a measured variable of a fluid conveyed in the fluid line system, namely at least a first measurement signal having signal parameters dependent on the measured variable, for example, a signal level dependent on the measured variable and/or a signal frequency dependent on the measured variable and/or a phase angle dependent on the measured variable, as well as at least a second sensor, especially a second sensor at least mounted on the second fluid line and/or at least placed in its vicinity and/or an electrodynamic second sensor and/or a second sensor embodied equally to the first sensor, for producing at least a second measurement signal corresponding to the measured variable, namely a second measurement signal having at least one signal parameter dependent on the measured variable, for example, a signal level dependent on the measured variable and/or a signal frequency dependent on the measured variable and/or a phase angle dependent on the measured variable.

In a fifth further development of the invention, the fluid line system further comprises: a first sensor, especially a first sensor at least mounted on the second fluid line and/or at least placed in its vicinity and/or an electrodynamic first sensor, for producing at least a first measurement signal corresponding to a measured variable of a fluid conveyed in the fluid line system, namely a first measurement signal at having least one signal parameter dependent on the measured variable, for example, a signal level dependent on the measured variable and/or a signal frequency dependent on the measured variable and/or a phase angle dependent on the measured variable, as well as a measuring- and operating electronics electrically coupled with the first sensor. In an embodiment of this further development of the invention, the measuring- and operating electronics is adapted to process the at least first measurement signal, for example, to ascertain by means of the first measurement signal measured values for the at least one measured variable.

In a sixth further development of the invention, the fluid line system further comprises:
at least one oscillation exciter, for example, an electrodynamic oscillation exciter, for exciting and maintaining mechanical oscillations, for example, bending oscillations, at least of the second fluid line, for example, also for exciting and maintaining mechanical oscillations of both the second fluid line as well as also the third fluid line; a first sensor, especially a first sensor at least mounted on the second fluid line and/or at least placed in its vicinity and/or an electrodynamic, first sensor, for producing at least a first measurement signal corresponding to a measured variable of a fluid conveyed in the fluid line system, namely a first measurement signal having at least one signal parameter dependent on the measured variable, for example, a signal level dependent on the measured variable and/or a signal frequency dependent on the measured variable and/or a phase angle dependent on the measured variable, as well as a measuring- and operating electronics electrically coupled both with the oscillation exciter as well as also the first sensor, wherein the measuring- and operating electronics is adapted to supply an electrical exciter signal to the oscillation exciter, and wherein the oscillation exciter is adapted to convert electrical power supplied by means of the exciter signal into mechanical power effecting mechanical oscillations of at least the second fluid line, especially both the second fluid line as well as also the third fluid line. In an embodiment of this further development of the invention, the measuring- and operating electronics is, furthermore, also adapted to process the at least first measurement signal, for example, to ascertain by means of the first measurement signal measured values for the at least one measured variable.

A basic idea of the invention is so to improve behavior of the acoustic wave impedance established in the fluid line system in the flow direction that also in an inlet side transition between the first fluid line and the second and third fluid lines, and in an outlet side transition between the fourth fluid line and the second and third fluid lines, as little as possible and/or only very small impedance jumps are present. Investigations with conventional fluid line systems of the type being discussed, namely with fluid line systems, in the case of which the fluid lines are so embodied that the outlet side, flow cross section, $A_{100,Min}$, of the first fluid line, the inlet side, flow cross section, $A_{200a}$, of the outlet side, flow cross section, $A_{200b}$, or the greatest flow cross section, $A_{200,Max}$, of the second fluid line, the inlet side, flow cross section, $A_{300a}$, of the outlet side, flow cross section, $A_{300b}$, or the greatest flow cross section, $A_{300,Max}$, of the third fluid line, as well as the inlet side, flow cross section, $A_{400,Min}$, of the fourth fluid line, together, fulfill one of the conditions:

$$(A_{200a}+A_{300a})/A_{100,Min}<0.5, \text{ and}$$

$$(A_{200a}+A_{300a})/A_{400,Min}<0.5,$$

and/or one of the conditions:

$$(A_{200,Max}+A_{300,Max})/A_{100,Min}<0.5, \text{ and}$$

$$(A_{200,Max}+A_{300,Max})/A_{400,Min}<0.5$$

have shown, namely, that especially also the above described transition regions have, or can bring about, very large impedance jumps. As a result of this, sound waves propagating in the fluid flowing through such a fluid line system can be directly multiply reflected, accompanied by an increased probability of the formation of standing sound waves within the second and third fluid lines. Surprisingly, it was possible further to determine that the impedance jumps can, however, be very simply, equally as well very effectively, minimized, such that the susceptibility of fluid line systems of the discussed type to sound induced, resonant oscillations can be significantly lessened, by providing the second and third fluid lines, in each case, with correspondingly enlarged flow cross sections in comparison with conventional fluid line systems and compared with the first and fourth fluid lines. This largely also within the installed dimensions so far established for conventional fluid line systems, especially an installed length measured from the first line end of the first fluid line to first line end of the fourth fluid line, and also an installed weight resulting therefrom. For preventing abrupt or extreme form changes between flow cross sections neighboring in the flow direction, the actual shape of the individual flow cross sections are of comparatively lower importance. Consequently, the flow cross sections can, per se, be largely freely matched to other structural specifications for the particular fluid line system, or be subordinate to other structural requirements for the construction of the fluid line system.

BRIEF DESCRIPTION OF THE DRAWINGS

The invention as well as advantageous embodiments thereof will now be explained in greater detail based on examples of embodiments, which are shown in the figures of the drawing. Equal, i.e. equally acting or equally functioning, parts are provided in all figures with equal reference characters; when perspicuity requires or it otherwise appears sensible, already presented reference characters are omitted in subsequent figures. Other advantageous embodiments or further developments, especially also combinations of, firstly, only individually explained aspects of the invention, result, furthermore, from the figures of the drawing and/or from claims per se.

The figures of the drawing show as follows:

FIGS. 3*a*, 3*b* are schematic views of different flow cross sections of fluid lines of a fluid line system of FIG. 1;

FIG. 3*c* shows curves of flow cross sections of fluid lines of a fluid line system of FIG. 1.

DETAILED DESCRIPTION IN CONJUNCTION WITH THE DRAWINGS

Figure 1:
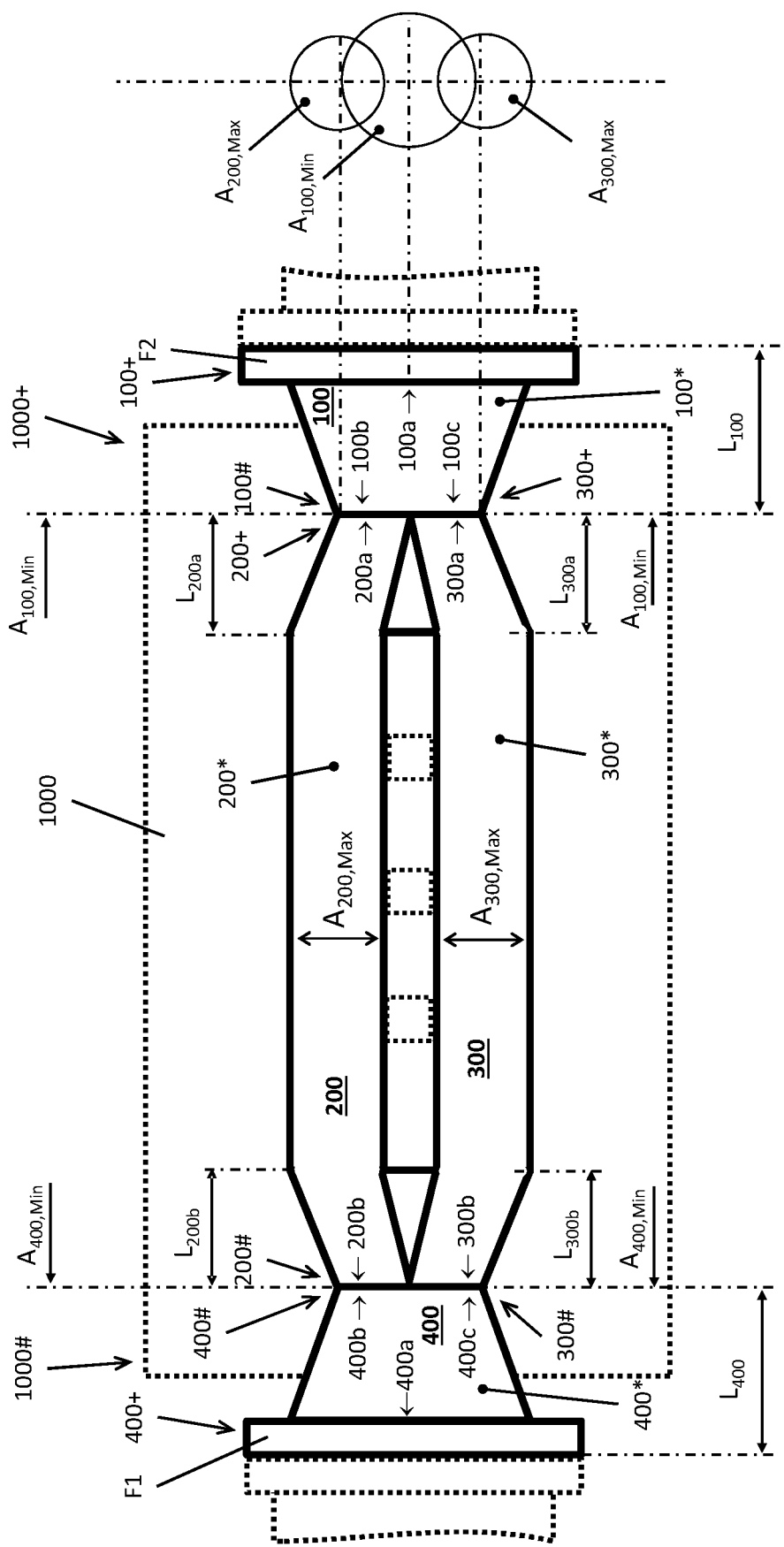
FIG. 1 is a schematic side view of a fluid line system, especially a fluid line system serving for measuring at least one physical, measured variable of a fluid flowing in a pipeline.
Figure 2:
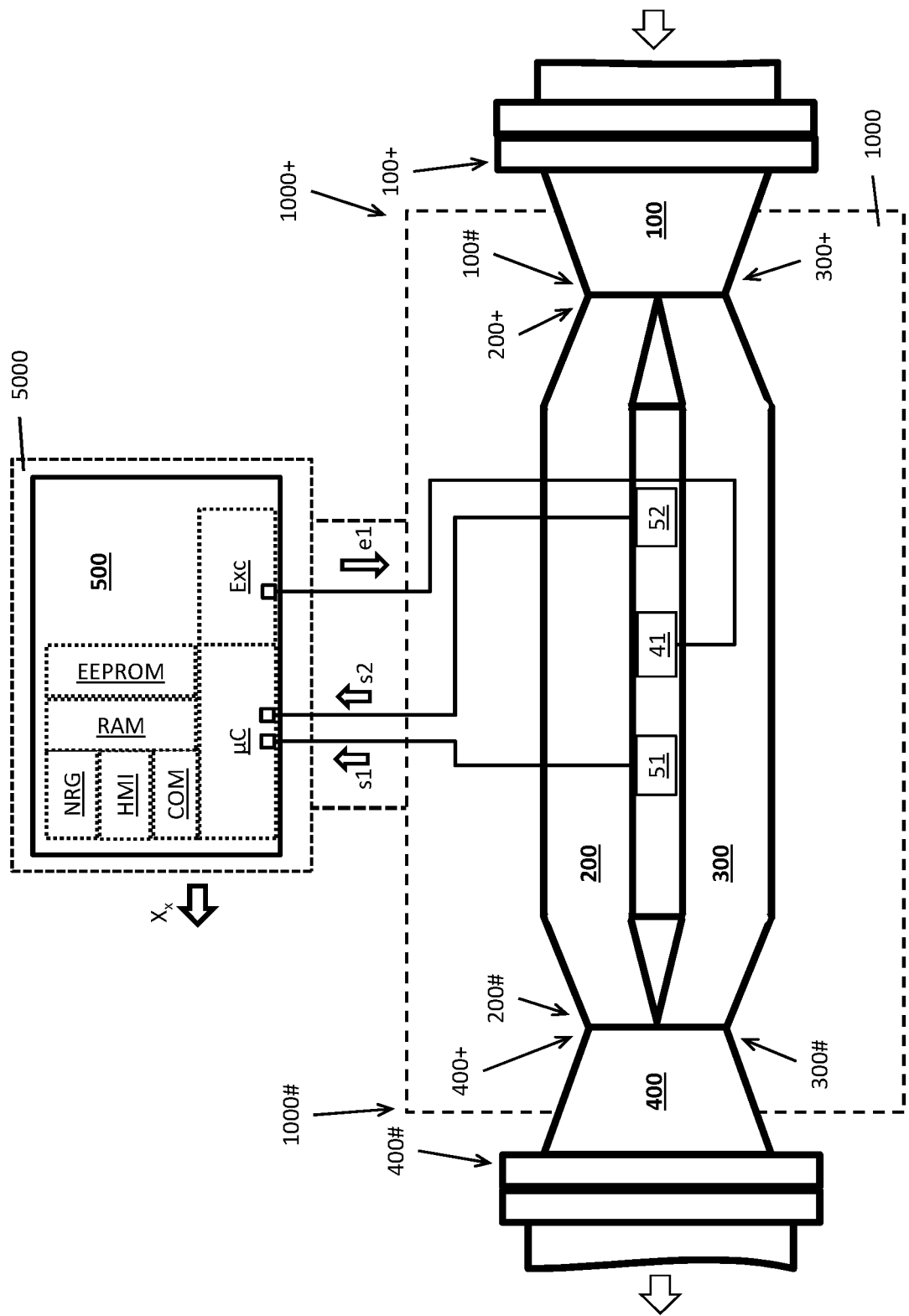
FIG. 2 is a schematic side view of another example of an embodiment of a fluid line system serving for measuring at least one physical, measured variable, especially a fluid line system formed as a vibronic measuring transducer.

Schematically shown in FIGS. 1 and 2 are examples of embodiments of fluid line systems serving for conveying a flowing fluid, for example, a liquid, a gas or a dispersion. The fluid line system is, in each case, especially, adapted to divide the fluid conveyed, for example, via a connected supply line segment of a pipeline, into at least two flow portions, to guide these in a flow direction of the fluid line system further along two parallel flow paths and thereafter to reunite the flow portions back to one fluid stream and to return that, for example, to a connected drain segment of the same pipeline. In an additional embodiment of the invention, the fluid line system is, furthermore, also provided and adapted for ascertaining measured values of at least one measured variable, for example, a mass flow rate, a total mass flow, a volume flow rate, a total volume flow, a density, a viscosity or a temperature, of a fluid to be transferred, and to form a corresponding measuring system. The fluid to be transferred can be, for example, a liquid, a gas or a dispersion; a fluid to be transferred by means of the fluid line system of the invention can accordingly, be, for example, a liquefied gas, such as e.g. a liquefied natural gas (LNG), or, for example, also a compressed gas, such as e.g. a compressed natural gas (CNG). The fluid line system can accordingly, such as, among other things, also indicated in FIG. 2, for example, also be an integral component of a, for example, vibronic, measuring transducer, and of a corresponding measuring system, for example, also formed as a prefabricated in-line measuring device.

The fluid line system comprises a first fluid line 100, for example, a first fluid line embodied as a connection nozzle, a second fluid line 200, for example, a second fluid line embodied as a rigid and/or at least sectionally circularly cylindrical tube, a third fluid line 300, for example, a third fluid line embodied as a rigid and/or at least sectionally circularly cylindrical tube and/or a third fluid line constructed equally to fluid line 200, as well as a fourth fluid line 400, for example, a fourth fluid line embodied as a connection nozzle and/or constructed equally to fluid line 100. Each of the above described fluid lines 100, 200, 300, 400 has a lumen 100*, 200*, 300*, **400* surrounded by a wall, for example, a metal wall, wherein the lumen 100* of the fluid line 100 extends from a first flow opening 100*a* located in a first line end 100+ of the fluid line 100 both until it reaches a second flow opening 100*b* located in a second line end 100# of the first fluid line 100 as well as also until it reaches a third flow opening 100*c* located spaced from the second flow opening 100*b* in the second line end 100# of the first fluid line 100, the lumen 200* of the fluid line 200 extends from a first flow opening 200*a* located in a first line end 200+ of the fluid line 200 until it reaches a second flow opening 200*b* located in a second line end 200# of the fluid line 200, the lumen 300* of the fluid line 300 extends from a first flow opening 300*a* located in a first line end 300+ of the fluid line 300 until it reaches a second flow opening 300*b* located in a second line end 300# of the fluid line 300, and the lumen 400* of the fluid line 400 extends from a first flow opening 400*a* located in a first line end 400+ of the fluid line 400 both until it reaches a second flow opening 400*b* located in a second line end 400# of the fluid line 400 as well as also until it reaches a third flow opening 400*c* located spaced from the second flow opening 400*b* in the second line end 400# of the fourth fluid line 400. Both the fluid line 200 as well as also the fluid line 300 are connected with their first line ends 200+ and 300+, in each case, with the line end 100# of the fluid line 100 and with their second line ends 200#, and 300#, with the line end 400# of the fluid line 400; this, especially, in such a manner that both the lumen of the fluid line 200 as well as also the lumen of the fluid line 300 communicate with the lumen of the fluid line 100, and with the lumen of the fluid line 400, and that the flow opening 200*a* of the fluid line 200 communicates with the flow opening 100*b* of the fluid line 100 and the flow opening 300*a* of the fluid line 300 communicates with the flow opening 100*c* of the fluid line 100 and/or that the flow opening 200*b* of the fluid line 200 communicates with the flow opening 400*b* of the fluid line 400 and the flow opening 300*b* of the fluid line 300 communicates with the flow opening 400*c* of the fluid line 400. The flow openings 200*a*, 200*b*, 300*a*, 300*b*, 100*b*, 100*c*, 400*c*, 400*d* can, in each case, be embodied, for example, circularly, semicircularly, or, as well as also shown in FIGS. 3*a* and 3*b*, with oval shape. In an additional embodiment of the invention, the flow opening 100*a*, i.e. a thereby formed, inlet side, flow cross section $A_{100a}$, of the fluid line 100 and/or the flow opening 400*a*, i.e. a thereby formed, outlet side, flow cross section $A_{400a}$ of the fluid line 400 are additionally, circularly embodied. The lumens of the second and third fluid lines 200, 300 can, in each case, be embodied, at least sectionally, especially also predominantly, circularly cylindrically. Moreover, the lumens of the second and third fluid lines 200, 300 can, in each case, be embodied, at least sectionally, also conically, for example, in each case, in a transition adjoining their flow openings 200*a*, 200*b*, 300*a*, and 300*b*.

The walls of the fluid lines 100, 200, 300, 400 can, such as quite usual in the case of fluid line systems of the type being discussed, be composed, at least partially, of a metal, especially a metal compatible at least as regards thermal expansion of the material of adjoining fluid lines, for example, titanium, zirconium, a stainless steel or a nickel based alloy. The lumen of the fluid line 100, and that of the fluid line 400, can additionally, be embodied in the manner of the lumen of a collector piece, thus essentially Y-shaped, or in the manner of the lumen of a T-piece, thus essentially T-shaped. Particularly for the above-described case, in which the fluid line system is provided to be incorporated into the course of a pipeline, and in which the first and/or fourth fluid lines 100, 400 are embodied as connection nozzles, and as also shown schematically in FIGS. 1 and 2, the line end 100+ of the fluid line 100 and the located flow opening 100a and/or the line end 400+ of the fluid line 400 and the located flow opening 400a can additionally, in each case, also be held by connecting flanges F1 and F2 compatible with connecting flanges provided, in given cases, on the above described pipeline.

The two fluid lines 200, 300 are, furthermore, so embodied that they have along the flow paths established in the fluid line system, and in the flow direction of the fluid line system, different flow cross sections, namely differently large and/or differently formed, flow cross sections, in such a manner that the fluid lines 200, 300 have mutually adjoining flow cross sections with mutually differing shapes and/or mutually differing sizes. In an additional embodiment of the invention, the first flow opening 200a of the fluid line 200 forms an inlet side, flow cross section $A_{200a}$ of the fluid line 200, for example, a circularly shaped, semicircle shaped or oval shaped, inlet side, flow cross section $A_{200a}$, and the second flow opening 200b of the fluid line 200 forms an outlet side, flow cross section $A_{200b}$ of the fluid line 200, for example, a circularly shaped, semicircle shaped or oval shaped, outlet side, flow cross section $A_{200b}$, the first flow opening 300a of the fluid line 300 forms a flow cross section $A_{300a}$ of the fluid line 300, for example, a circularly shaped, semicircle shaped or oval shaped, outlet side, flow cross section $A_{300a}$, and the second flow opening 300b of the fluid line 300 forms an outlet side, flow cross section $A_{300b}$ of the fluid line 300, for example, a circularly shaped, semicircle shaped or oval shaped, outlet side, flow cross section $A_{300b}$. Moreover, the fluid lines 200, 300 of the fluid line system of the invention are, furthermore, so embodied that, as well as also shown schematically in FIG. 1a, a greatest flow cross section $A_{200,Max}$, $A_{300,Max}$ of the fluid line 200, 300 is spaced both from the first line end 200+, 300+, as well as also from the second line end 200#, 300#.

Each of the above described flow cross sections $A_{200a}$, $A_{300a}$, $A_{200b}$, $A_{300b}$ of the second and third fluid lines 200, 300 can, such as just indicated, be embodied circularly, semicircle shaped or, as well as also schematically shown in FIGS. 3a and 3b, for example, oval shaped, for example, also in such a manner that the flow cross sections $A_{200a}$, $A_{300a}$, $A_{200b}$, $A_{300b}$, are, in each case, equally formed and, in each case, equally large. Accordingly, in an additional embodiment of the invention, the fluid line 200 and the fluid line 300 are so embodied that their flow cross sections $A_{200a}$, $A_{300a}$, $A_{200b}$, and $A_{300b}$ fulfill at least one of the conditions: $A_{200a}=A_{300a}$, $A_{200b}=A_{300b}$, $A_{200a}=A_{200b}$, and $A_{300a}=A_{300b}$. In an additional embodiment of the invention, the lumen of the fluid line 200 is at least sectionally, especially also predominantly, circularly cylindrically embodied, and additionally, the greatest flow cross section $A_{200,Max}$ of the fluid line 200 is located in a circularly cylindrical section of the lumen and/or the lumen of the fluid line 300 is at least sectionally, especially predominantly, circularly cylindrically embodied and the greatest flow cross section $A_{300,Max}$ of the fluid line 300 is located in a circularly cylindrical section of the lumen. Accordingly, the greatest flow cross section $A_{200,Max}$ of the fluid line 200, and the greatest flow cross section $A_{300,Max}$ of the fluid line 300 are circularly embodied. The second and third fluid lines 200, 300 can additionally, be so embodied that the greatest flow cross section $A_{200,Max}$ of the fluid line 200 and the greatest flow cross section $A_{300,Max}$ of the fluid line 300 are equally large, namely, together, fulfill a condition: $A_{200,Max}=A_{300,Max}$.

As already mentioned, a tendency of the above described fluid line system, not least of all also its fluid lines 200, 300, to execute resonant oscillations, which are induced by sound propagating in the through flowing fluid, or by standing sound waves established in the through flowing fluid, is co-determined, especially, by a layout of acoustic waves, or flow impedances, formed in the fluid line system in the flow direction. The layout of the acoustic wave impedances is lastly also dependent on the degree, with which mutually adjoining flow cross sections of the fluid lines differ from one another in the flow direction as regards size and/or shape. Through further investigations, it was possible, in such case, to identify an inlet side transition located between the first fluid line 100 and the second and third fluid lines 200, 300, and an outlet side transition located between the fourth fluid line 400 and the second and third fluid lines 200, 300 as especially critical for forming standing sound waves in the fluid line system. For the purpose of preventing critical impedance jumps, namely abrupt, equally as well standing sound waves within the second and third fluid lines 200, 300, provoking changes of the acoustic wave impedances of the fluid line system along its flow direction, the first fluid line 100, the second fluid line 200 and the third fluid line 300 are so embodied in the case of the fluid line system of the invention that an outlet side, flow cross section $A_{100,Min}$ of the fluid line 100 located at the line end 100# of the fluid line 100, and equally as well adjoining the flow opening 100b as well as the flow opening 100c of the fluid line 100, the inlet side, flow cross section $A_{200a}$ of the fluid line 200, as well as the inlet side, flow cross section $A_{300a\ of\ the}$ fluid line 300, together, fulfill a condition:

$$0.8<(A_{200a}+A_{300a})/A_{100,Min}, \quad (1)$$

and that the outlet side, flow cross section $A_{100,Min}$, the greatest flow cross section $A_{200,Max}$ of the fluid line 200, as well as the greatest flow cross section $A_{300,Max}$ of the second and third fluid lines 200, 300, together, fulfill a condition:

$$0.9<(A_{200,Max}+A_{300,Max})/A_{100,Min}, \quad (2)$$

or the second fluid line 200, the third fluid line 300 and the fourth fluid line 400 in the case of the fluid line system of the invention are so embodied that the outlet side, flow cross section $A_{200b}$ of the fluid line 200, the outlet side, flow cross section $A_{300b}$ of the fluid line 300, as well as an inlet side, flow cross section $A_{400,Min}$ of the fluid line 400 located at the line end 400+ of the fluid line 400, equally as well adjoining the flow opening 400b as well as the flow opening 400c of the fluid line 400, together, fulfill a condition:

$$0.8<(A_{200b}+A_{300b})/A_{400,Min} \quad (3)$$

and that the greatest flow cross section $A_{200,Max}$ of the fluid line 200, the greatest flow cross section $A_{300,Max}$ of the fluid line 300 as well as the inlet side, flow cross section $A_{400,Min}$ of the fluid line 400, together, fulfill a condition:

$$0.9<(A_{200,Max}+A_{300,Max})/A_{400,Min}. \quad (4)$$

For preventing or reducing disturbance sources potentially inducing sound in the through flowing fluid within the above described in-, and outlet side, transition regions, in additional embodiment of the invention, the lumen of the fluid line 200 is embodied sectionally, namely in a first transition of the fluid line 200 extending from its inlet side, flow cross section $A_{200a}$ in the direction toward its greatest flow cross section $A_{200,Max}$ and/or in a second transition of the fluid line 200 extending from its outlet side, flow cross section $A_{200b}$ in the direction toward its greatest flow cross section $A_{200,Max}$, conically, in such a manner that mutually adjoining flow cross sections $A_{200,j}$ of the fluid line 200, starting from its inlet side, flow cross section $A_{200a}$ in a direction $zj^+$ toward its greatest flow cross section $A_{200,Max}$ increase continuously, for example, linearly or, as indicated in FIG. 3c, exponentially, and that mutually adjoining flow cross sections $A_{200,j}$ of the fluid line 200 increase, starting from its outlet side, flow cross section $A_{200b}$ in a direction $zj^-$ toward its greatest flow cross section $A_{200,Max}$, continuously, for example, linearly or exponentially. Moreover, in additional embodiment, the lumen of the fluid line 300 is embodied sectionally, namely in a first transition of the fluid line 300 extending from its inlet side, flow cross section $A_{300a}$ in the direction toward its greatest flow cross section $A_{300,Max}$ and/or in a second transition of the fluid line 300 extending from its outlet side, flow cross section $A_{300b}$ in the direction toward its greatest flow cross section $A_{300,Max}$, conically, in such a manner that mutually adjoining flow cross sections $A_{300,j}$ of the fluid line 300, starting from its inlet side, flow cross section $A_{300a}$ in the direction $zj^+$ toward its greatest flow cross section $A_{300,Max}$ increase continuously, for example, linearly or exponentially, and in such a manner that mutually adjoining flow cross sections $A_{300,j}$ of the fluid line 300, starting from its outlet side, flow cross section $A_{300b}$ in the direction $zj^-$ toward its greatest flow cross section $A_{300,Max}$, increase continuously, especially linearly or exponentially.

Furthermore, the fluid lines 200, 300 can in advantageous manner be so embodied that both a length $L_{200a}$ of the first transition region of the fluid line 200 as well as also a length $L_{200b}$ of the second transition region of the fluid line 200, measured as a shortest separation between the flow cross section $A_{200a}$, or $A_{200b}$, as the case may be, and the flow cross section $A_{200,Max}$ lying nearest thereto, fulfill one of the conditions:

$$L_{200a} \geq 0.5((A_{200,Max})^{1/2} - (A_{200a})^{1/2}), \text{ and} \qquad (5)$$

$$L_{200b} \geq 0.5((A_{200,Max})^{1/2} - (A_{200a})^{1/2}) \qquad (6)$$

and/or one of the conditions:

$$L_{200a} \leq 2 \cdot (\sqrt{A_{200,Max}} - \sqrt{A_{200a}}), \text{ and} \qquad (7)$$

$$L_{200b} \leq 0.5((A_{200,Max})^{1/2} - (A_{200a})^{1/2}) \qquad (8)$$

and that both a length $L_{300a}$ of the first transition region of the fluid line 300 as well as also a length $L_{300b}$ of the second transition region of the fluid line 300, measured as a shortest separation between the flow cross section $A_{300a}$, or $A_{300b}$, as the case may be, and the flow cross section $A_{300,Max}$ lying nearest thereto, fulfill one of the conditions:

$$L_{300a} \geq 0.5((A_{300,Max})^{1/2} - (A_{300a})^{1/2}), \text{ and} \qquad (9)$$

$$L_{300b} \geq 0.5((A_{300,Max})^{1/2} - (A_{300a})^{1/2}) \qquad (10)$$

and/or one of the conditions:

$$L_{300a} \leq 2 \cdot (\sqrt{A_{300,Max}} - \sqrt{A_{300a}}), \text{ and} \qquad (11)$$

$$L_{300b} \leq 0.5((A_{300,Max})^{1/2} - (A_{300a})^{1/2}). \qquad (12)$$

The lengths $L_{200a}$, $L_{200b}$, $L_{300a}$, $L_{300b}$ actually optimal for the particular fluid line system can then be found, for example, as a compromise between a layout of the acoustic wave impedances sufficiently good for the desired low susceptibility of the fluid line system and a total length of the fluid lines 200 and 300 sufficiently large for the particularly desired high accuracy of measurement of the fluid line system.

For additional improvement of the above described layout of the acoustic waves and flow impedances of the fluid line system, in an additional embodiment of the invention, the fluid lines 100, 200 and 300 are, furthermore, so embodied that the outlet side, flow cross section $A_{100,Min}$ of the fluid line 100, the greatest flow cross section $A_{200,Max}$ of the fluid line 200 as well as the greatest flow cross section $A_{300,Max}$ of the fluid line 300, together, fulfill a condition:

$$(A_{200,Max} + A_{300,Max})/A_{100,Min} < 1.1, \qquad (13)$$

and/or the fluid lines 200, 300 and 400 are, furthermore, so embodied that the greatest flow cross section $A_{200,Max}$, the greatest flow cross section $A_{300,Max}$ as well as the inlet side, flow cross section $A_{400,Min}$ the of fluid line 400, together, fulfill a condition:

$$(A_{200,Max} + A_{300,Max})/A_{400,Min} < 1.1; \qquad (14)$$

this ideally such that for of the above described flow cross sections $A_{200,Max}$, $A_{300,Max}$, $A_{100,Min}$, and $A_{400,Min}$, at least approximately:

$$\frac{A_{200,Max} + A_{300,Max}}{A_{100,Min}} = 1, \text{ and} \qquad (15)$$

$$\frac{A_{200,Max} + A_{300,Max}}{A_{400,Min}} = 1. \qquad (16)$$

Alternatively thereto or in supplementation thereof, the fluid line 200 is, furthermore, so embodied that its inlet side, flow cross section $A_{200a}$ and its greatest flow cross section $A_{200,Max}$ fulfill a condition:

$$0.7 < A_{200a}/A_{200,Max} < 1, \text{ especially a condition} \\ 0.8 < A_{200a}/A_{200,Max} < 0.95, \qquad (17)$$

and/or that its outlet side, flow cross section ($A_{200b}$) and its greatest flow cross section ($A_{200,Max}$) fulfill a condition:

$$0.7 < A_{200b}/A_{200,Max} < 1, \text{ especially a condition} \\ 0.8 < A_{200b}/A_{200,Max} < 0.95, \qquad (18)$$

and the fluid line 300 is so embodied that its inlet side, flow cross section $A_{300a}$ and its greatest flow cross section $A_{300,Max}$ fulfill a condition:

$$0.7 < A_{300a}/A_{300,Max} < 1, \text{ especially a condition} \\ 0.8 < A_{300a}/A_{300,Max} < 0.95, \qquad (19)$$

and/or that its outlet side, flow cross section $A_{300b}$ and its greatest flow cross section $A_{300,Max}$ fulfill a condition:

$$0.7 < A_{300b}/A_{300,Max} < 1, \text{ especially a condition} \\ 0.8 < A_{300b}/A_{300,Max} < 0.95. \qquad (20)$$

As indicated, for instance, in FIGS. 1, 3a, and 3b, the outlet side, flow cross section $A_{100,Min}$ of the fluid line 100, and the inlet side, flow cross section $A_{400,Min}$ of the fluid line 400, can, such as quite usual in the case of fluid line systems of the type being discussed, be embodied, for example, circularly; in case required, for instance, for the purpose of providing an additional degree of freedom beneficial for fulfilling the above described conditions (1) and (2), and (3) and (4) as well as, in given cases, also the conditions (5), (6), (7), and (8) in the design of the fluid line system, the two flow cross sections $A_{100,Min}$, $A_{400,Min}$ can, however, also be embodied non-circularly, for example, even oval-shaped. In an additional embodiment of the invention, the fluid lines 100, 400 are, furthermore, so embodied that the outlet side, flow cross section $A_{100,Min}$ of the fluid line 100 and the inlet side, flow cross section $A_{400,Min}$ of the fluid line 400, together, fulfill a condition: $A_{100,Min}=A_{400,Min}$.

In order to enable that the fluid line system, such as quite usual in the case of such fluid line systems, can be incorporated into a pipeline with a nominal cross section, which is greater than the outlet side, flow cross section $A_{100,Min}$ of the fluid line 100, consequently greater than a sum $A_{200a}+A_{300a}$ of the flow cross sections $A_{200a}$, $A_{300a}$, and greater than the inlet side, flow cross section $A_{400,Min}$ of the fluid line 400, consequently greater than a sum $A_{200b}+A_{300b}$ of the flow cross sections $A_{200b}$, $A_{300b}$, in additional embodiment of the invention, it is, furthermore, provided that the fluid line 100, is so embodied that its inlet side, flow cross section $A_{100a}$ as well as its outlet side, flow cross section $A_{100,Min}$, together, fulfill a condition:

$$1 < \frac{A_{100a}}{A_{100,Min}}, \text{ especially a condition } 1.5 < A_{100a}/A_{100,Min}, \quad (21)$$

and that the fluid line 400 is so embodied that its inlet side, flow cross section $A_{400,Min}$ as well as its outlet side, flow cross section $A_{400a}$, together, fulfill a condition:

$$1 < \frac{A_{400a}}{A_{400,Min}}, \text{ especially a condition } 1.5 < A_{400a}/A_{400,Min}. \quad (22)$$

In order to prevent that a too high pressure drop is brought about in the through flowing fluid by the fluid line system, in an additional embodiment of the invention, it is, furthermore, provided that the above described flow cross sections $A_{100a}$, $A_{100,Min}$, and $A_{400a}$, $A_{400,Min}$, furthermore, fulfill one of the following conditions:

$$\frac{A_{100a}}{A_{100,Min}} < 3, \text{ and} \quad (23)$$

$$\frac{A_{400a}}{A_{400,Min}} < 3. \quad (24)$$

The fluid lines 100, 400 are, additionally, preferably so embodied that the inlet side, flow cross section $A_{100a}$ forms a greatest flow cross section $A_{100,Max}$ of the fluid line 100, and the outlet side, flow cross section $A_{400a}$ forms a greatest flow cross section $A_{400,Max}$ of the fluid line 400. Furthermore, the fluid lines 100, 400 can in advantageous manner be so embodied that a length $L_{100}$ of the fluid line 100, measured as a shortest separation between its two flow openings 100a, 100b, or its two line ends 100+, 100#, fulfills a condition:

$$L_{100a} \geq 0.5((A_{100a})^{1/2}-(A_{100,Min})^{1/2}) \quad (25)$$

and/or a condition:

$$L_{100a} \leq 2 \cdot (\sqrt{A_{100a}}-\sqrt{A_{100,Min}}), \quad (26)$$

and that a length $L_{400}$ of the fluid line 400, measured as a shortest separation between its two flow openings 400a, 400b, or its two line ends 400+, 400#, fulfills a condition:

$$L_{400a} \geq 0.5((A_{400a})^{1/2}-(A_{400,Min})^{1/2}) \quad (27)$$

and/or a condition:

$$L_{400a} \leq 2 \cdot (\sqrt{A_{400a}}-\sqrt{A_{400,Min}}). \quad (28)$$

The lengths $L_{100}$, $L_{400}$ actually optimal for the particular fluid line system can then be found, for example, again, as a compromise between a layout of the acoustic wave impedances sufficiently good for the desired low susceptibility of the fluid line system and an installed length predetermined by the structural conditions at the location of use of the fluid line system, measured as a maximum separation between the two flow openings 100a, 400a, or the two line ends 100+, 400+.

Figure 4:
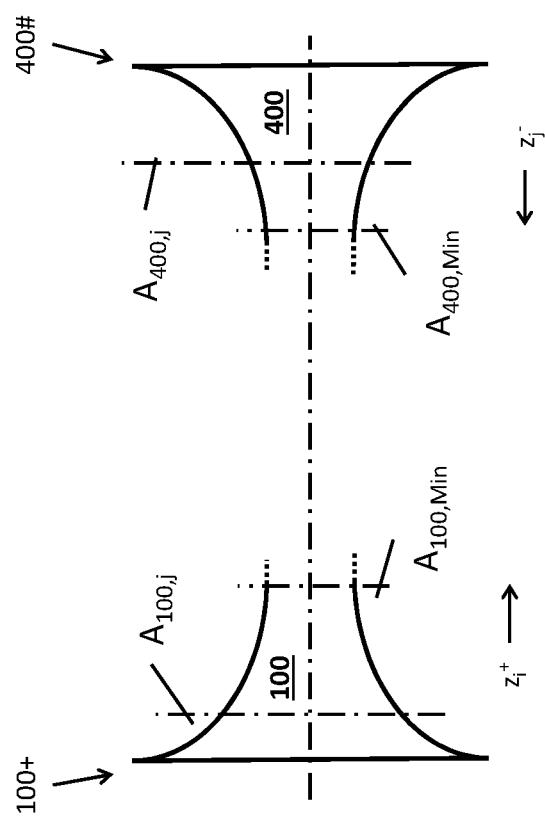
FIG. 4 shows courses of flow cross-sections of fluid lines of a fluid line system according to FIG. 1.

For improvement of the above described layout of the acoustic waves, and flow impedances, of the fluid line system also in the inlet region of the fluid line system formed by the fluid line 100, and in the outlet region of the fluid line system formed by the fluid line 400, in an additional embodiment of the invention, the fluid lines 100 and/or the fluid lines 400 are, furthermore, so embodied that the lumen of the fluid line 100, and that of the fluid line 400, are, as well as also directly evident schematically in FIG. 1, 2 or 4, and their combination, at least sectionally, for example, also predominantly, circularly conically embodied; this, for example, also in such a manner that the outlet side, flow cross section $A_{100,Min}$ of the fluid line 100 is located in a circularly conical section of the lumen of the fluid line 100, and mutually adjoining flow cross sections $A_{100,i}$ of the fluid line 100 continuously increase, starting from its outlet side, flow cross section $A_{100,Min}$, in a direction $zi^+$ toward the line end 100+ of the fluid line 100, for example, increase according to the formula:

$$A_{100,i}=A_{100,Min} \cdot e^{kzi}, \quad (29)$$

and that the smallest flow cross section $A_{400,Min}$ of the fluid line 400 is located in a circularly conical section of the lumen of the fluid line 400, and mutually adjoining flow cross sections $A_{400,j}$ of the fluid line 400 increase, starting from its inlet side, flow cross section $A_{400,Min}$, in a direction $zj^+$ toward its line end 400+, continuously and/or according to the formula:

$$A_{400,j}=A_{400,Min} \cdot e^{kzj} \quad (30)$$

The fluid line system of the invention can, such as indicated above, and not least of all also shown, among other things, in FIG. 2, also be a component of a measuring system, or comprise such a measuring system, serving for measuring at least one measured variable, such as e.g. a density, a viscosity, a flow parameter, such as, for instance, a mass flow rate or a volume flow rate, and/or a temperature, of a flowing fluid. The measuring system, in turn, can, for example, be formed by means of a vibronic measuring transducer, for example, also one serving for generating Coriolis forces dependent on a mass flow rate of the flowing fluid, for instance, according to one of the above cited patent documents, EP-A 816 807, US-A 2001/0037690, US-A 2008/0184816, U.S. Pat. Nos. 4,823,613, 5,602,345, 5,796, 011, US-A 2011/0146416, US-A 2011/0265580, US-A 2012/0192658, WO-A 90/15310, WO-A 00/08423, WO-A 2006/107297, WO-A 2006/118557, WO-A 2008/059262, WO-A 2009/048457, WO-A 2009/078880, WO-A 2009/120223, WO-A 2009/123632, WO-A 2010/059157, WO-A 2013/006171 or WO-A 2013/070191 or even applicant's own, not pre-published, German patent application DE102014118367.3, e.g. be a conventional Coriolis-mass flow-measuring device formed by means of such a vibronic measuring transducer. In the case of such a fluid line system, it can additionally, be, for example, also a transfer location for traffic in goods where certification is obligatory, such as e.g. a dispensing plant for fuels, or a transfer location.

In an additional embodiment of the invention, it is, consequently, provided that the fluid lines 100, 200, 300, 400 are components of a measuring transducer serving for generating at least one measurement signal corresponding to the above described, at least one measured variable, for example, a vibronic measuring transducer. The fluid line 100 can, accordingly, for example, also be formed by means of a distributor piece of such a measuring transducer, for example, thus by means of a distributor piece of a vibronic measuring transducer and/or a measuring transducer of a Coriolis-mass flow-measuring device, and such a distributor piece can be formed by means of the fluid line 100. The distributor piece can, for example, be adapted as a line fork of the above described measuring transducer serving for dividing a supplied fluid flow into two parallel flow portions; the distributor piece can, however, also be a line junction of the above described measuring transducer serving for bringing two parallel fluid streams together to form a combined flow. Accordingly, also the fluid line 400 can be a component of the same measuring transducer, for example, be formed by means of an additional distributor piece of the measuring transducer, which, complementary to the other distributor piece, is adapted as a line junction serving for bringing two parallel fluid streams together to form a total flow, or as a line fork serving for dividing a supplied fluid flow into two parallel flow portions.

Accordingly, the fluid line system, as well as also shown schematically in FIG. 2, comprises, in an additional embodiment of the invention, at least a first sensor 51 for producing at least a first measurement signal s1 corresponding to a measured variable x of a fluid conveyed in the fluid line system, namely at least a first measurement signal s1 having a signal parameter dependent on the measured variable, especially an electrical or analog, first measurement signal. The at least one measured variable x can be, such as mentioned above, for example, a density, a viscosity or a temperature of the fluid, in given cases, also a flowing fluid. The measured variable x can, however, for example, also be a flow parameter, such as, for instance, a mass flow rate or a volume flow rate. Serving as a signal parameter dependent on the measured variable can be, in turn, for example, a signal level of the measurement signal dependent on the at least one measured variable, a signal frequency of the measurement signal dependent on the measured variable and/or a phase angle of the measurement signal dependent on the measured variable. The sensor 51 can, as indicated in FIG. 2, be placed away from the fluid lines 200, 300, equally as well in the vicinity of the fluid line 200 and/or in the vicinity of the fluid line 300, for example, also in such a manner that the sensor 51 is placed at least on the fluid line 200, or both on the fluid line 200 as well as also on the fluid line 300.

For the above mentioned case, in which the fluid line 200 is a component of a vibronic measuring transducer, in an additional embodiment of the invention, at least the fluid line 200 is adapted to be flowed through by fluid and during that to be caused to vibrate. Moreover, also the fluid line 300 can be adapted, for example, for the case, in which both the fluid line 200 as well as also the fluid line 300 are components of the above described, vibronic measuring transducer, to be flowed through by fluid and during that to be caused to vibrate; this, for example, also in such a manner that the two fluid lines 200, 300 are simultaneously flowed through by fluid and/or during that are caused to vibrate simultaneously, especially are caused to vibrate opposite-equally. Accordingly, the fluid line system of an additional embodiment of the invention can, furthermore, comprise at least one oscillation exciter 41, especially an electromechanical, or electrodynamic, oscillation exciter, for exciting and maintaining mechanical oscillations, for example, bending oscillations, of at least the fluid line 200, or for exciting and/or maintaining mechanical oscillations of both the fluid line 200 as well as also the fluid line 300. Furthermore, in the above described case, the sensor 51 can be an oscillation sensor, for example, an electrodynamic oscillation sensor and/or an oscillation sensor differentially registering oscillatory movements of the two fluid lines 200, 300. Particularly for the mentioned case, in which the fluid line system is provided to measure a mass flow rate based on Coriolis forces generated in the flowing fluid, the fluid line system can, supplementally to the sensor 51, also have at least a second sensor 52 for producing at least a second measurement signal s2, especially an electrical and/or analog, second measurement signal, corresponding to the measured variable. The sensor 52 can be of equal construction to that of the sensor 51 and/or be positioned removed with equal separation as that of the sensor 51 from the fluid line 200, or from the fluid lines 200, 300. Alternatively or supplementally, the sensors 51, 52 can be positioned symmetrically relative to the oscillation exciter 41, for example, also in such a manner that, as indicated in FIG. 2 and such as quite usual in the case of vibronic measuring transducers of the above described type, the sensor 52 is further removed from the fluid line 100 than the sensor 51, and, conversely, the sensor 51 is further removed from the fluid line 400 than the sensor 52 and/or in such a manner that the sensor 51 is removed equally far from the fluid line 100 as the sensor 52 from the fluid line 400.

For the purpose of processing and evaluation of the at least one measurement signal s1, the fluid line system can further comprise a measuring- and operating electronics 500 electrically coupled with the sensor 51, or with the sensors 51, 52, as the case may be, and formed, for example, by means of at least one microprocessor and/or digital signal processor (DSP). The measuring- and operating electronics 500 can, as shown schematically in FIG. 2, advantageously, be accommodated in an adequately dust- and watertight, impact- and explosion resistant, protective housing 5000. Especially, the measuring- and operating electronics 500 can, furthermore, be adapted to process the at least one measurement signal s1, or the measurement signals s1, s2, as the case may be, especially to ascertain by means of the measurement signal s1 measured values Xx for the at least one measured variable x. For the above described case, in which the fluid line system is equipped with at least one oscillation exciter 41, the measuring- and operating electronics 500 can additionally, be electrically coupled with the oscillation exciter 41. In an additional embodiment of the invention, the measuring- and operating electronics 500 is, furthermore, adapted to supply an electrical exciter signal e1 to the oscillation exciter 41, and the oscillation exciter 41 is additionally, adapted to convert electrical power supplied by means of the exciter signal e1 into mechanical power effecting mechanical oscillations of at least the fluid line 200, or into mechanical power effecting mechanical oscillations of both the fluid line 200 as well as also the fluid line 300.

Particularly for the mentioned case, in which the fluid line system is embodied as a component of a measuring system, the fluid line system can, as well as also schematically shown in FIG. 2, further comprise a protective housing 1000 for the fluid lines 200, 300. The protective housing 1000 includes, surrounded by a wall, a cavity, within which the fluid line 200 and at least the fluid line 300 are placed. Particularly for the purpose of forming a protective housing in sufficient measure torsion- and bending-stiff, impact- and pressure resistant, its wall can, for example, be manufactured of a metal, for instance, a stainless steel, and/or embodied at least partially hollow cylindrically. As indicated, furthermore, in FIG. 2, additionally, a first housing end 1000+ of the protective housing 1000 can be formed by means of the fluid line 100, for instance, in such a manner that the fluid line 100 is an integral component of the protective housing and/or that the protective housing 1000 has, laterally limiting the above-mentioned cavity, a side wall, which is affixed laterally to the fluid line 100, e.g. is connected therewith by material bondng. Moreover, additionally, a second housing end 1000# of the protective housing 1000 can be formed by means of the fluid line 400, for example, also such that both the fluid line 100 as well as also the fluid line 400 are integral components of the protective housing, and that the protective housing 1000 has, laterally limiting the cavity, a side wall, which is affixed laterally both to the fluid line 100 as well as also to the fluid line 400, and connected by material bonding with the first fluid line.

The invention claimed is:

1. A fluid line system, comprising:
 a first fluid line with a lumen surrounded by a wall and extending from a first flow opening, located in a first line end of said first fluid line, both until it reaches a second flow opening, located in a second line end of said first fluid line, as well as also until it reaches a third flow opening, located spaced from said second flow opening in said second line end of said first fluid line;
 a second fluid line with a lumen surrounded by a wall and extending from a first flow opening, located in a first line end of said second fluid line, until it reaches a second flow opening, located in a second line end of said second fluid line, in such a manner that a greatest flow section of said second fluid line is spaced both from its first line end as well as also from its second line end;
 at least a third fluid line with a lumen surrounded by a wall and extending from a first flow opening, located in a first line end of said third fluid line, until it reaches a second flow opening located in a second line end of the third fluid line, in such a manner that a greatest flow cross section of said third fluid line is spaced both from its first line end as well as also from its second line end;
 a fourth fluid line with a lumen surrounded by a wall and extending from a first flow opening, located in a first line end of said fourth fluid line, both until it reaches a second flow opening, located in a second line end of said fourth fluid line, as well as also until it reaches a third flow opening, spaced from said second flow opening and located in said second line end of said fourth fluid line, wherein:
 both said second fluid line with its first line end as well as also said third fluid line with its first line end are, in each case, connected with said second line end of said first fluid line;
 both said second fluid line with its second line end as well as also said third fluid line with its second line end are, in each case, connected with said second line end of said fourth fluid line;
 said first flow opening of said third fluid line forms an inlet side flow cross section of said third fluid line, and said second flow opening of said third fluid line forms an outlet side flow cross section of said third fluid line;
 said first fluid line, said second fluid line and said third fluid line are so embodied that, an outlet side flow cross section ($A_{100,Min}$) of said first fluid line located at said second end line of said first fluid line adjoin said second flow opening as well as said third flow opening of said first fluid line, the inlet side, flow cross section ($A_{200a}$) of said second fluid line as well as the inlet side flow cross section ($A_{300a}$) of said third fluid line, together, fulfill a condition:

$$0.8 < (A_{200a} + A_{300a})/A_{100,Min}$$

and the outlet side flow cross section ($A_{100,Min}$) of said first fluid line, the greatest flow cross section ($A_{200,Max}$) of said second fluid line as well as the greatest flow cross section ($A_{300,Max}$), of said third fluid line, together, fulfill a condition:

$$0.9 < (A_{200,Max} + A_{300,Max})/A_{100,Min} \text{ and/or}$$

said first fluid line, said second fluid line and said fourth fluid line are so embodied that, the outlet side flow cross section ($A_{200b}$) of said second fluid line, the outlet side flow cross section ($A_{300b}$) of said third fluid line as well as an inlet side flow cross section ($A_{400,Min}$) of said fourth fluid line located at said second line end of said fourth fluid line, equally as well adjoining said second flow opening as well as said third flow opening of said fourth fluid line, together, fulfill a condition:

$$0.8 < (A_{200a} + A_{300a})/A_{400,Min},$$

and the greatest flow cross section ($A_{200,Max}$) of said second fluid line, the greatest flow cross section ($A_{300,Max}$) of said third fluid line as well as the inlet side flow cross section ($A_{400,Min}$) of said fourth fluid line, together, fulfill a condition:

$$0.9 < (A_{200,Max} + A_{300,Max})/A_{400,Min}.$$

2. The fluid line system as claimed in claim 1, wherein:
said first fluid line, said second fluid line and said third fluid line are so embodied that the outlet side flow cross section ($A_{100,Min}$) of said first fluid line, the greatest flow cross section of said second fluid line as well as the greatest flow cross section of said third fluid line, together, fulfill a condition:

$$(A_{200,Max} + A_{300,Max})/A_{100,Min} < 1.1; \text{ and/or}$$

wherein said second fluid line, said third fluid line and said fourth fluid line are so embodied that the greatest flow cross section of said second fluid line, the greatest flow cross section of said third fluid line as well as the inlet side flow cross section ($A_{400,Min}$) of said fourth fluid line, together, fulfill a condition:

$$(A_{200,Max} + A_{300,Max})/A_{400,Min} < 1.1.$$

3. The fluid line system as claimed in claim 1, wherein:
the lumen of said second fluid line is sectionally conical, in a first transition extending from its inlet side flow cross section ($A_{200a}$) in the direction toward its greatest flow cross section ($A_{200,Max}$) and/or in a second transition extending from its outlet side flow cross section ($A_{200b}$) in the direction toward its greatest flow cross section ($A_{200,Max}$), in such a manner that mutually adjoining flow cross sections ($A_{200,j}$) of said second fluid line increase, starting from its inlet side flow cross section ($A_{200a}$) in a direction ($z_j^+$) toward its greatest flow cross section ($A_{200,Max}$), continuously, linearly or exponentially and/or in such a manner that mutually adjoining flow cross sections ($A_{200,j}$) of said second fluid line increase, starting from its outlet side flow cross section ($A_{200b}$) in a direction ($zj^-$) toward its greatest flow cross section ($A_{200,Max}$), continuously, linearly or exponentially.

4. The fluid line system as claimed in claim 1, wherein: the lumen of said third fluid line is sectionally conical, in a first transition extending from its inlet side flow cross section ($A_{300a}$) in the direction toward its greatest flow cross section ($A_{300,Max}$) and/or in a second transition extending from its outlet side flow cross section ($A_{300b}$) in the direction toward its greatest flow cross section ($A_{300,Max}$), in such a manner that mutually adjoining flow cross sections ($A_{300,j}$) of said third fluid line increase, starting from its inlet side flow cross section ($A_{300a}$) in a direction ($zj^+$) toward its greatest flow cross section ($A_{300,Max}$), continuously, linearly or exponentially, and/or in such a manner that mutually adjoining flow cross sections ($A_{300,j}$) of said third fluid line increase, starting from its outlet side flow cross section ($A_{300b}$) in a direction ($zj^-$) toward its greatest flow cross section ($A_{300,Max}$), continuously, linearly or exponentially.

5. The fluid line system as claimed in claim 1, wherein: said second fluid line and said third fluid line are so embodied that the greatest flow cross section ($A_{200,Max}$) of said second fluid line and the greatest flow cross section ($A_{300,Max}$) of said third fluid line, together, fulfill a condition:

$A_{200,Max}=A_{300,Max}$; and/or said first fluid line as well as said fourth fluid line are so embodied that the outlet side flow cross section ($A_{100,Min}$) of said first fluid line and the inlet side flow cross section ($A_{400,Min}$) of said fourth fluid line, together, fulfill a condition:

$A_{100,Min}=A_{400,Min}$.

6. The fluid line system as claimed in claim 1, wherein: the lumen of said second fluid line is embodied at least sectionally, cylindrically; and the greatest flow cross section ($A_{200,Max}$) of said second fluid line is located in a cylindrical section of the lumen.

7. The fluid line system as claimed in claim 1, wherein: the lumen of said third fluid line is embodied at least sectionally, cylindrically; and the greatest flow cross section ($A_{300,Max}$) of said third fluid line is located in a cylindrical section of the lumen.

8. The fluid line system as claimed in claim 1, wherein: said second fluid line and said third fluid line are so embodied, that the inlet side flow cross section ($A_{200a}$) of said second fluid line as well as the inlet side flow cross section ($A_{300a}$) of said third fluid line fulfill a condition: $A_{200a}=A_{300a}$; and/or the outlet side flow cross section ($A_{200b}$) of said second fluid line as well as the outlet side flow cross section ($A_{300b}$) of said third fluid line fulfill a condition: $A_{200b}=A_{300b}$; and/or the inlet side flow cross section ($A_{200a}$) as well as the outlet side flow cross section ($A_{200b}$) of said second fluid line fulfill a condition: $A_{200a}=A_{200b}$; and/or the inlet side flow cross section ($A_{300a}$) as well as the outlet side flow cross section ($A_{300b}$) of said third fluid line fulfill a condition: $A_{300a}=A_{300b}$; and/or the inlet side flow cross section ($A_{200a}$) and/or the outlet side flow cross section ($A_{200b}$) of said second fluid line form a smallest flow cross section ($A_{200,Min}$) of said second fluid line; and/or the inlet side flow cross section ($A_{300a}$) and/or the outlet side flow cross section ($A_{300b}$) of said third fluid line form a smallest flow cross section ($A_{300,Min}$) of said third fluid line.

9. The fluid line system as claimed in claim 1, wherein: the outlet side flow cross section ($A_{100,Min}$) of said first fluid line is oval shaped; and/or the inlet side flow cross section ($A_{200a}$) of said second fluid line is oval shaped or semicircle shaped; and/or the inlet side flow cross section ($A_{300a}$) of said third fluid line is oval shaped or semicircle shaped; and/or the outlet side flow cross section ($A_{200b}$) of said second fluid line is oval shaped or semicircle shaped; and/or the outlet side flow cross section ($A_{300b}$) of said third fluid line is oval shaped or semicircle shaped; and/or the inlet side flow cross section ($A_{400,Min}$) of said fourth fluid line is oval shaped; and/or said second fluid line is so embodied that its inlet side flow cross section ($A_{200a}$) and its greatest flow cross section ($A_{200,Max}$) fulfill a condition:

$0.7<A_{200a}/A_{200,Max}<1$, a condition $0.8<A_{200a}/A_{200,Max}<0.95$; and/or said third fluid line is so embodied that its inlet side flow cross section ($A_{300a}$) and its greatest flow cross section ($A_{300,Max}$) fulfill a condition:

$0.7<A_{300a}/A_{300,Max}<1$, a condition $0.8<A_{300a}/A_{300,Max}<0.95$; and/or said second fluid line is so embodied that its outlet side flow cross section ($A_{200b}$) and its greatest flow cross section ($A_{200,Max}$) fulfill a condition:

$0.7<A_{200b}/A_{200,Max}<1$, a condition $0.8<A_{200b}/A_{200,Max}<0.95$; and/or said third fluid line is so embodied that its outlet side flow cross section ($A_{300b}$) and its greatest flow cross section ($A_{300,Max}$) fulfill a condition:

$0.7<A_{300b}/A_{300,Max}<1$, a condition $0.8<A_{300b}/A_{300,Max}<0.95$.

10. The fluid line system as claimed in claim 1, wherein: the lumen of said first fluid line is embodied, at least sectionally, conically, in such a manner that mutually adjoining flow cross sections ($A_{100,i}$) of said first fluid line increase, starting from its outlet side flow cross section ($A_{100,Min}$), in a direction ($zi^+$) toward the first line end continuously and/or according to the formula:

$A_{100,i}=A_{100,Min} \cdot e^{k \cdot zi}$; and the outlet side flow cross section ($A_{100,Min}$) of said first fluid line is located in a circularly conical section of the lumen of said first fluid line.

11. The fluid line system as claimed in claim 1, wherein: the lumen of said fourth fluid line is embodied, at least sectionally, conically, in such a manner that mutually adjoining flow cross sections ($A_{400,j}$) of said fourth fluid line increase, starting from its inlet side flow cross section ($A_{400,Min}$), in a direction ($zj^+$) toward its second line end continuously and/or according to the formula:

$A_{400,j}=A_{400,Min} \cdot e^{k \cdot zj}$; and the smallest flow cross section ($A_{400,Min}$) of said fourth fluid line is located in a conical section of the lumen said fourth fluid line.

12. The fluid line system as claimed in claim 1, wherein:
said first flow opening of said first fluid line forms an inlet side flow cross section ($A_{100a}$) of said first fluid line; and
said first flow opening of said fourth fluid line forms an outlet side flow cross section ($A_{400a}$) of said fourth fluid line,
said first fluid line and said fourth fluid line are so embodied, that the inlet side flow cross section ($A_{100a}$) of said first fluid line forms a greatest flow cross section ($A_{100,Max}$) of said first fluid line; and/or
the outlet side flow cross section ($A_{400a}$) forms a greatest flow cross section ($A_{400,Max}$) of said fourth fluid line.

13. The fluid line system as claimed in claim 1, wherein:
the greatest flow cross section ($A_{200,Max}$) of said second fluid line is circularly shaped; and/or
the greatest flow cross section ($A_{300,Max}$) of said third fluid line is circularly shaped.

14. The fluid line system as claimed in claim 1, wherein:
said first fluid line is so embodied that its inlet side flow cross section ($A_{100a}$) as well as its outlet side flow cross section ($A_{100,Min}$), together, fulfill a condition:

$$1 < \frac{A_{100a}}{A_{100,Min}},$$

a condition $1.5 < A_{100a}/A_{100,Min}$ and/or a condition $$\frac{A_{100a}}{A_{100,Min}} < 3;$$

and/or
said fourth fluid line is so embodied that its inlet side flow cross section ($A_{400,Min}$) as well as its outlet side flow cross section ($A_{400a}$), together, fulfill a condition:

$$1 < \frac{A_{400a}}{A_{400,Min}},$$

a condition $1.5 < A_{400a}/A_{400,Min}$ and/or a condition $$\frac{A_{400a}}{A_{400,Min}} < 3;$$

and/or
the inlet side flow cross section of said first fluid line is circularly shaped; and/or
the outlet side flow cross section of said fourth fluid line is circularly shaped.

15. The fluid line system as claimed in claim 1, wherein:
at least said second fluid line and said third fluid line are components of a vibronic measuring transducer, serving for generating at least one measurement signal (s1, s2) corresponding to the at least one measured variable.

16. The fluid line system as claimed in claim 1, wherein:
at least said second fluid line is adapted to be flowed through by fluid and during that flow to be caused to vibrate.

17. The fluid line system as claimed in claim 16, wherein:
said third fluid line is adapted with said second fluid line, to be flowed through by fluid and during that flow, to be caused to vibrate, simultaneously with said second fluid line.

18. The fluid line system as claimed in claim 1, further comprising:
at least one electrodynamic oscillation exciter, for exciting and maintaining mechanical bending oscillations, of at least said second fluid line, and for exciting and maintaining mechanical oscillations of both said second fluid line as well as also said third fluid line.

19. The fluid line system as claimed in claim 18, wherein:
said measuring- and operating electronics is electrically coupled with said oscillation exciter.

20. The fluid line system as claimed in claim 19, wherein:
said measuring- and operating electronics is adapted to supply an electrical exciter signal to the oscillation exciter; and
said oscillation exciter is adapted to convert electrical power supplied by means of the exciter signal (e1) into mechanical power effecting mechanical oscillations of at least said second fluid line.

21. The fluid line system as claimed in claim 1, further comprising:
at least a first sensor at least mounted on said second fluid line and/or at least placed in its vicinity; and/or
an electrodynamic first sensor, for producing at least a first measurement signal (s1) corresponding to a measured variable of a fluid conveyed in the fluid line system, said first measurement signal having at least one signal parameter dependent on the measured variable.

22. The fluid line system as claimed in claim 21, further comprising:
at least a second sensor at least mounted on said second fluid line and/or at least placed in its vicinity; and/or
an electrodynamic second sensor, for producing at least a second measurement signal (s2) corresponding to the measured variable, said second measurement signal having at least one signal parameter dependent on the measured variable, said signal level dependent on the measured variable and/or a signal frequency dependent on the measured variable and/or a phase angle dependent on the measured variable.

23. The fluid line system as claimed in claim 21, further comprising:
a measuring- and operating electronics electrically coupled with said first sensor.

24. The fluid line system as claimed in claim 23, wherein:
said measuring- and operating electronics is adapted to process at least said first measurement signal, to ascertain by means of said first measurement signal measured values for the at least one measured variable.

25. The fluid line system as claimed in claim 1, further comprising:
a protective housing for said second fluid line and said third fluid line; and
said protective housing has a cavity surrounded by a metal wall, within which are placed said second fluid line and at least said third fluid line.

26. The fluid line system as claimed in claim 25, wherein:
a first housing end of said protective housing is formed by said first fluid line;
a second housing end of said protective housing is formed by said fourth fluid line, in such a manner that both said first fluid line as well as also said fourth fluid line are integral components of said protective housing and/or that said protective housing has, laterally limiting the cavity, a side wall, which is affixed laterally both to said first fluid line as well as also to said fourth fluid line, connected by material bonding both to said first fluid line as well as also to said fourth fluid line.

27. The fluid line system as claimed in claim 1, wherein: said first fluid line is formed by a distributor piece of a measuring transducer, a distributor piece formed as a line fork or line junction, one in the form of a vibronic measuring transducer and/or a measuring transducer of a Coriolis-mass flow-measuring device.

28. The fluid line system as claimed in claim 1, wherein: said first fluid line forms a distributor piece of a measuring transducer, a distributor piece embodied as a line fork or line junction, one in the form of a vibronic measuring transducer and/or a measuring transducer of a Coriolis-mass flow-measuring device.

29. The fluid line system as claimed in claim 1, wherein: said fourth fluid line is formed by a distributor piece of a measuring transducer, a distributor piece formed as a line fork or line junction, or a distributor piece in the form of a vibronic measuring transducer and/or a measuring transducer of a Coriolis-mass flow-measuring device.

30. The fluid line system as claimed in claim 1, wherein: said fourth fluid line forms a distributor piece of a measuring transducer, a distributor piece embodied as a line fork or line junction, or a distributor piece in the form of a vibronic measuring transducer and/or a measuring transducer of a Coriolis-mass flow-measuring device.

31. The use of a fluid line system of claim 1 for ascertaining measured values of at least one measured variable, a mass flow rate, a total mass flow, a volume flow rate, a total volume flow, a density, a viscosity or a temperature, of a fluid to be transferred, a liquefied gas, for example, a methane and/or ethane and/or propane and/or butane containing, liquefied gas and/or a liquefied natural gas (LNG), or a compressed gas, for example, a compressed natural gas (CNG).

* * * * *